United States Patent
Nishigaki et al.

(10) Patent No.: US 6,301,395 B1
(45) Date of Patent: Oct. 9, 2001

(54) IMAGE PROCESSING APPARATUS THAT CAN APPROPRIATELY ENHANCE CONTOUR OF AN IMAGE

(75) Inventors: Junji Nishigaki; Yoshihiko Hirota; Koji Tsukada, all of Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/988,469

(22) Filed: Dec. 10, 1997

(30) Foreign Application Priority Data

Dec. 12, 1996 (JP) .................................................. 8-332530
Dec. 12, 1996 (JP) .................................................. 8-332531

(51) Int. Cl.$^7$ ........................................................ G06K 9/40
(52) U.S. Cl. ................................................. 382/266; 358/512
(58) Field of Search ................................ 382/266, 270, 382/165, 271, 167, 162, 199, 195, 284, 260; 358/512, 515, 529

(56) References Cited

U.S. PATENT DOCUMENTS 5,666,443 * 9/1997 Kumashiro ............................ 382/266
5,712,924 * 1/1998 Fujimoto et al. ..................... 382/165
5,784,500 * 7/1998 Homma et al. ....................... 382/270

FOREIGN PATENT DOCUMENTS 06152929  5/1994 (JP) .
06152960  5/1994 (JP) .

* cited by examiner

*Primary Examiner*—Jerome Grant, II
(74) *Attorney, Agent, or Firm*—McDermott, Will & Emery

(57) ABSTRACT

A neighborhood select circuit of an image processing apparatus includes a comparator receiving a predetermined signal and output data from a contour enhancement unit for comparing the received inputs and providing a comparison result signal according to the comparison result, a neighborhood maximum value-minimum value circuit and neighborhood minimum value-maximum value circuit receiving data output from the contour enhancement unit, and a selector for receiving the output from the neighborhood maximum value-minimum value circuit, the neighborhood minimum value-maximum value circuit and the comparator. In the neighborhood maximum value-minimum value circuit, the target pixel data in the data output from the contour enhancement unit is substituted with the maximum data in the data of the surrounding pixels, and the target pixel data subjected to the process is substituted with the minimum value in the data of the surrounding pixels.

18 Claims, 42 Drawing Sheets

FIG. 4

| 0 | 0 | $-\frac{1}{4}$ | 0 | 0 |
|---|---|---|---|---|
| 0 | 0 | 0 | 0 | 0 |
| $-\frac{1}{4}$ | 0 | 1 | 0 | $-\frac{1}{4}$ |
| 0 | 0 | 0 | 0 | 0 |
| 0 | 0 | $-\frac{1}{4}$ | 0 | 0 |

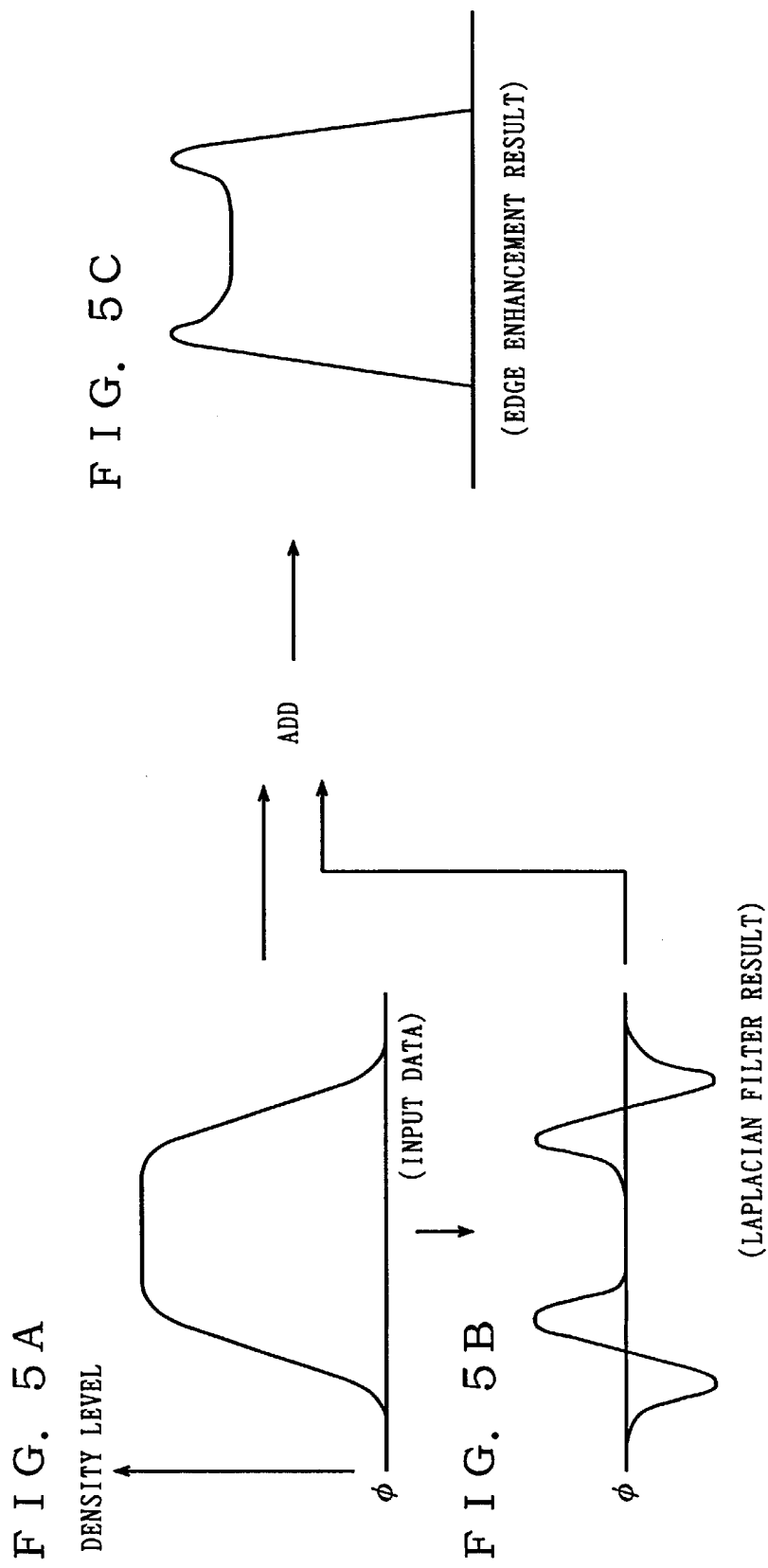

FIG. 6B

| 1/8 | 0   | 0 | 0    | -1/8 |
|-----|-----|---|------|------|
| 1/8 | 1/8 | 0 | -1/8 | -1/8 |
| 1/8 | 1/8 | 0 | -1/8 | -1/8 |
| 1/8 | 1/8 | 0 | -1/8 | -1/8 |
| 1/8 | 0   | 0 | 0    | -1/8 |

FIG. 6A

| 1/8  | 1/8  | 1/8  | 1/8  | 1/8  |
|------|------|------|------|------|
| 0    | 1/8  | 1/8  | 1/8  | 0    |
| 0    | 0    | 0    | 0    | 0    |
| 0    | -1/8 | -1/8 | -1/8 | 0    |
| -1/8 | -1/8 | -1/8 | -1/8 | -1/8 |

FIG. 7

|       |       |       |       |       |
|-------|-------|-------|-------|-------|
| $a_{11}$ |       | $a_{13}$ |       | $a_{15}$ |
|       | $a_{22}$ | $a_{23}$ | $a_{24}$ |       |
| $a_{31}$ | $a_{32}$ | $a_{33}$ | $a_{34}$ | $a_{35}$ |
|       | $a_{42}$ | $a_{43}$ | $a_{44}$ |       |
| $a_{51}$ |       | $a_{53}$ |       | $a_{55}$ |

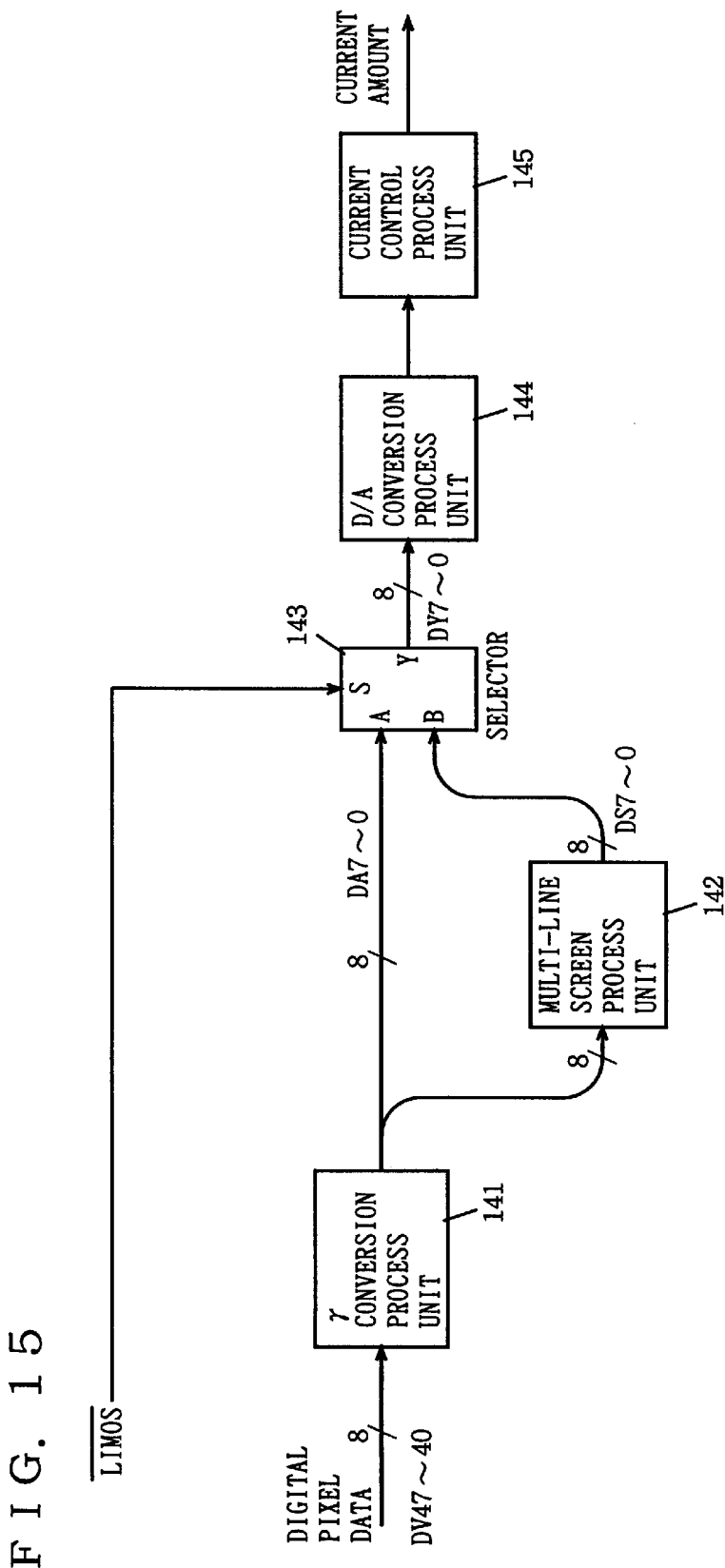

FIG. 19A — $g_{ij}$ BINARIZED IMAGE DATA

FIG. 19B — $a_{ij}$ MASK DATA

FIG. 19C — $a_{ij} \cdot g_{ij}$

FIG. 19D

| 1 | 0 | 1 | 1 | 1 |
|---|---|---|---|---|
| 1 | 1 | 0 | 1 | 1 |
| 1 | 1 | 0 | 1 | 1 |
| 0 | 0 | 0 | 1 | 1 |
| 0 | 0 | 0 | 0 | 0 |

FIG. 19E

| 0 | 0 | 1 | 0 | 0 |
|---|---|---|---|---|
| 0 | 0 | 1 | 0 | 0 |
| 1 | 1 | 1 | 1 | 1 |
| 0 | 0 | 1 | 0 | 0 |
| 0 | 0 | 1 | 0 | 0 |

FIG. 19F

| 0 | 0 | 1 | 0 | 0 |
|---|---|---|---|---|
| 0 | 0 | 1 | 0 | 0 |
| 1 | 1 | 0 | 1 | 1 |
| 0 | 0 | 1 | 0 | 0 |
| 0 | 0 | 1 | 0 | 0 |

FIG. 20

IN CONTRACT PROCESS

| ⓛ | ⓛ | 1 | ⓛ | ⓛ |
|---|---|---|---|---|
| ⓛ | ⓛ | 1 | ⓛ | ⓛ |
| 0 | 1 | 0 | 0 | 0 |
| ⓛ | ⓛ | 1 | ⓛ | ⓛ |
| ⓛ | ⓛ | 1 | ⓛ | ⓛ |

ORIGINAL IMAGE

DENSITY

PIXEL POSITION

F I G. 24B

IMAGE SUBJECTED TO NEIGHBORHOOD
MAXIMUM VALUE-MINIMUM VALUE PROCESS

DENSITY

PIXEL POSITION

IMAGE SUBJECTED TO NEIGHBORHOOD MINIMUM VALUE-MAXIMUM VALUE PROCESS

ORIGINAL IMAGE

FIG. 31A

PIXEL DATA

TARGET PIXEL

| 16 | 21 | 7 | 5 | 18 | 15 |
|---|---|---|---|---|---|
| 25 | 14 | 9 | ④ | 2 | 22 |
| 13 | 23 | 11 | 6 | 10 | 12 |
| 20 | 19 | 3 | 8 | 24 | |
| 1 | | 17 | | | |

FIG. 31B

MASK DATA

CORRESPONDING TO TARGET PIXEL

| 0 | 0 | 1 | 0 | 0 |
|---|---|---|---|---|
| 0 | 1 | 1 | 1 | 0 |
| 1 | 1 | ① | 1 | 1 |
| 0 | 1 | 1 | 1 | 0 |
| 0 | 0 | 1 | 0 | 0 |

FIG. 31C

NEIGHBORHOOD PIXEL DATA SUBJECTED TO MASK PROCESS

TARGET PIXEL

| 0 | 0 | 13 | 0 | 0 |
|---|---|---|---|---|
| 0 | 7 | 9 | 2 | 0 |
| 14 | 11 | ④ | 10 | 24 |
| 0 | 5 | 6 | 8 | 0 |
| 0 | 0 | 17 | 0 | 0 |

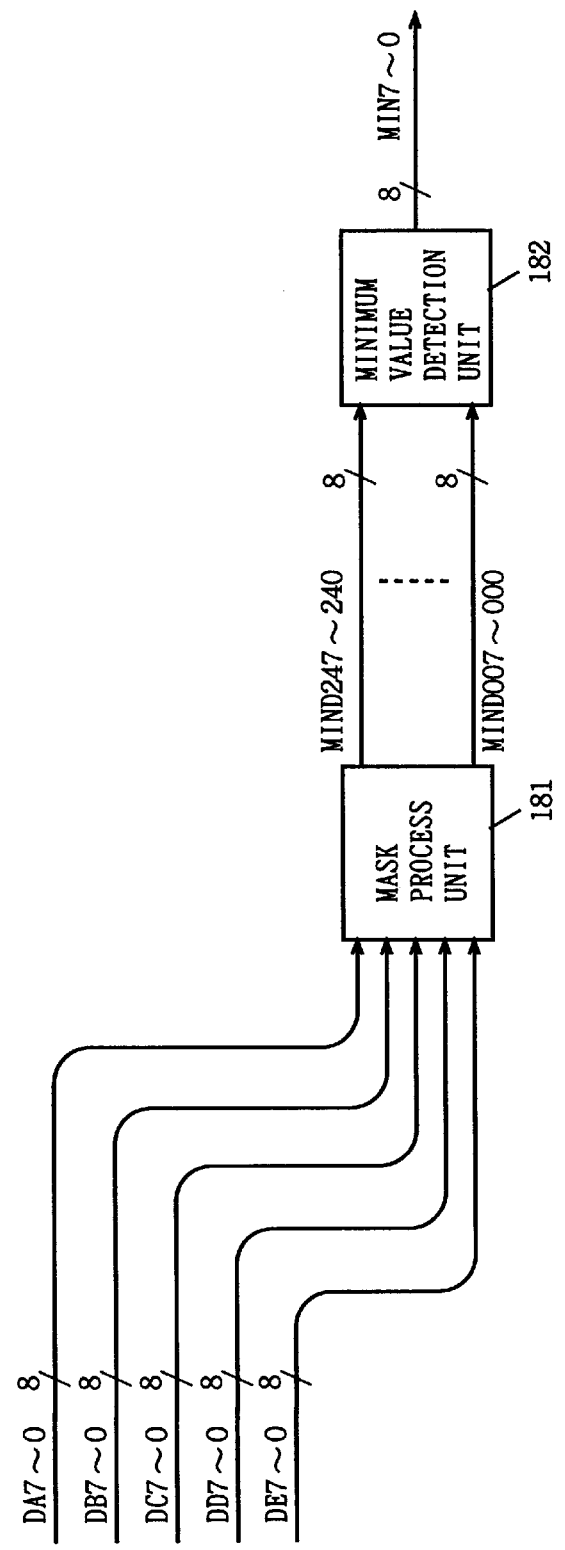

FIG. 35A

PIXEL DATA

TARGET PIXEL

| 16 | 21 | 14 | 23 | 19 |
|----|----|----|----|----|
| 25 | 7  | 9  | 11 | 3  |
| 13 | 5  | ④  | 6  | 17 |
| 20 | 2  | 10 | 8  | 22 |
| 1  | 18 | 24 | 15 | 12 |

FIG. 35B

MASK DATA

CORRESPONDING TO TARGET PIXEL

| 0 | 0 | 1 | 0 | 0 |
|---|---|---|---|---|
| 0 | 1 | 1 | 1 | 0 |
| 1 | 1 | ① | 1 | 1 |
| 0 | 1 | 1 | 1 | 0 |
| 0 | 0 | 1 | 0 | 0 |

FIG. 35C

NEIGHBORHOOD PIXEL DATA SUBJECTED TO MASK PROCESS

TARGET PIXEL

| 255 | 255 | 14 | 255 | 255 |
|-----|-----|----|-----|-----|
| 255 | 7   | 9  | 11  | 255 |
| 13  | 5   | ④  | 6   | 17  |
| 255 | 2   | 10 | 8   | 255 |
| 255 | 255 | 24 | 255 | 255 |

FIG. 36B
MINIMUM VALUE
DETECTION RESULT
TARGET PIXEL
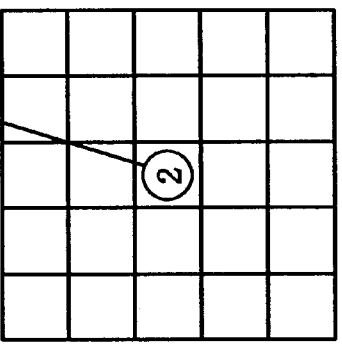
FIG. 36A
NEIGHBORHOOD PIXEL DATA
SUBJECTED TO MASK PROCESS
TARGET PIXEL
MINIMUM VALUE

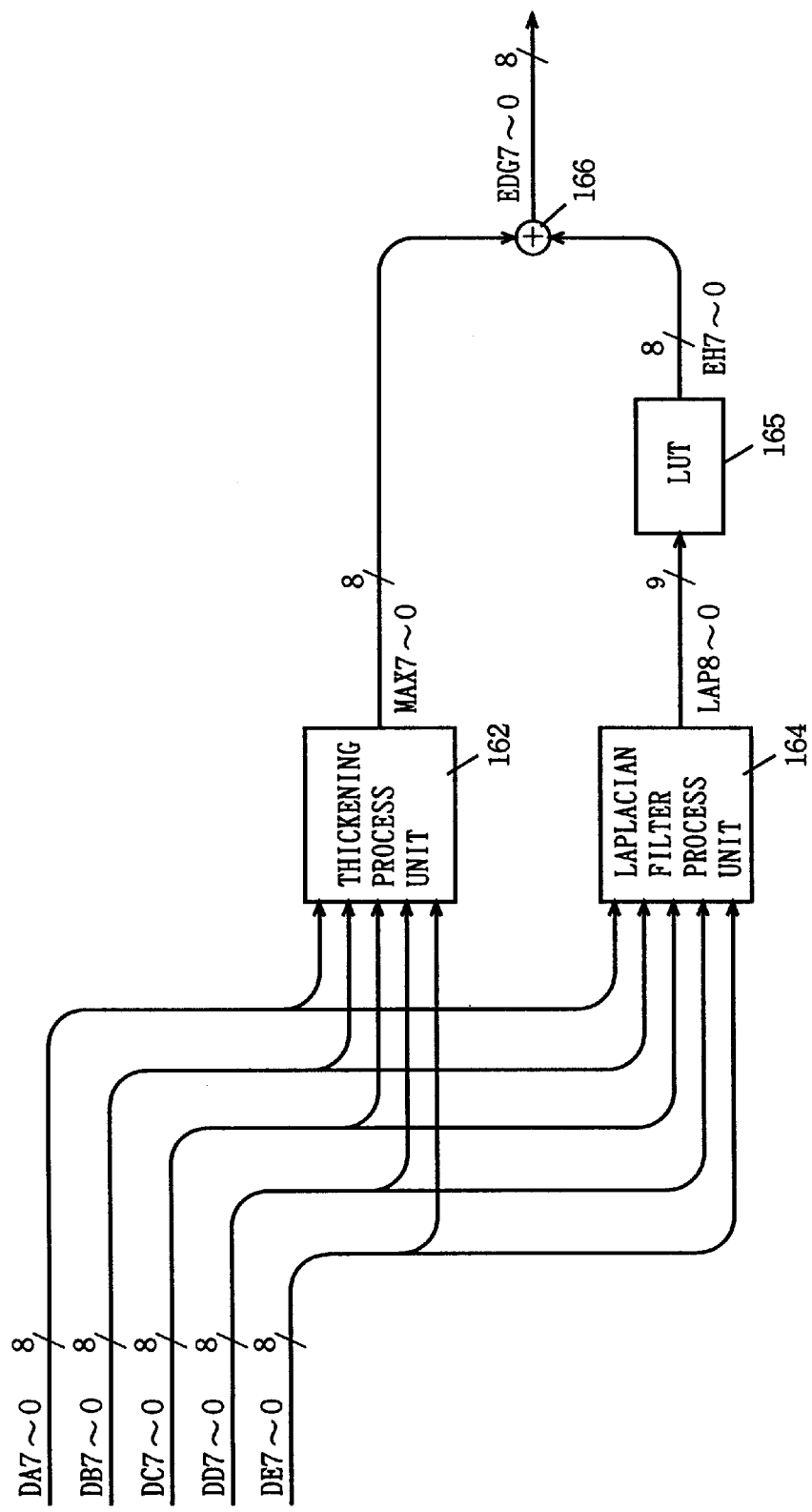
F I G. 37

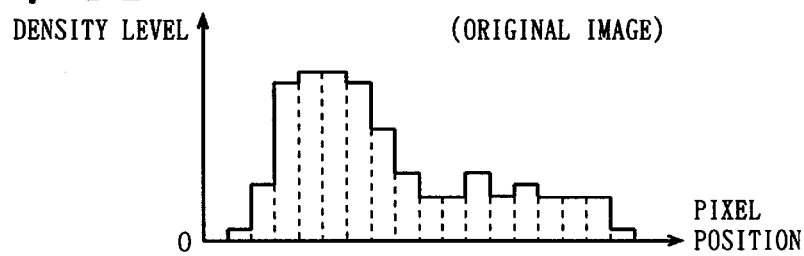
FIG. 41A (ORIGINAL IMAGE)
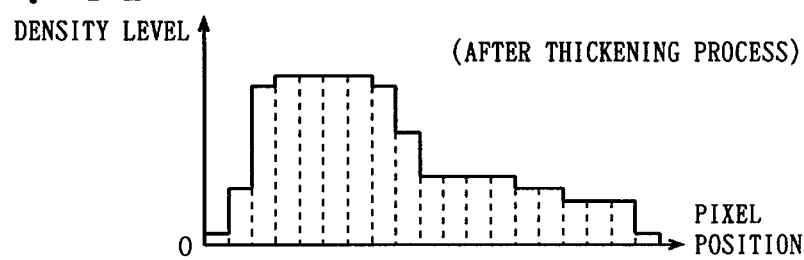
FIG. 41B (AFTER THICKENING PROCESS)
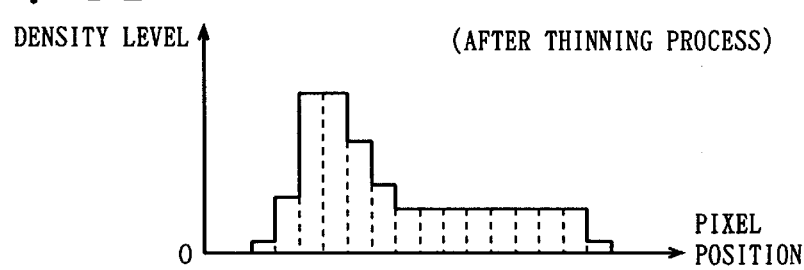
FIG. 41C (AFTER THINNING PROCESS)
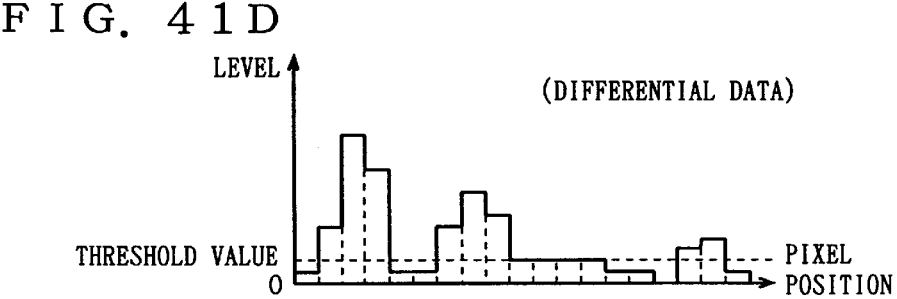
FIG. 41D (DIFFERENTIAL DATA)
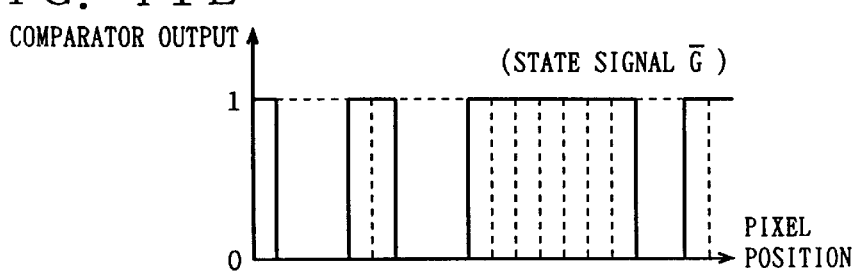
FIG. 41E (STATE SIGNAL $\overline{G}$)

(ORIGINAL IMAGE)

(AFTER CONTOUR ENHANCEMENT PROCESS)

(STATE SIGNAL $\bar{G}$)

(AFTER CONTOUR ENHANCEMENT PROCESS ACCORDING TO REGION DETERMINATION)

IMAGE PROCESSING APPARATUS THAT CAN APPROPRIATELY ENHANCE CONTOUR OF AN IMAGE

BACKGROUND OF THE INVENTION

1. Field of the Invention

The present invention relates to an image processing apparatuses, and more particularly, to an image processing apparatus that carries out a process of enhancing the contour of an image on image data sent from an image reader that reads out an original image.

2. Description of the Related Art

In a conventional image processing apparatus, differential image data is extracted from the original image data using a Laplacian filter as disclosed in Japanese Patent Laying-Open No. 6-152960. The data is converted according to a lookup table (LUT) into contour enhanced image data. A contour enhancement process is carried out by adding the contour enhanced image data to the original image data. Application of a contour enhancement process can be suppressed according to the result of a region determination for each pixel data forming the image data.

Japanese Patent Laying-Open No. 6-152929 discloses the technique of expanding the readout image by an arbitrary amount in the main scanning direction and the sub scanning direction of the image reader to reduce the problem of thinning, blurring, and disconnection in the text and image.

However, increasing the detection level of the contour to be enhanced will cause the difference in density between the contour portion such as a character and the region other than a character to be increased. The reproduced image was extremely poor in picture quality since the characters subjected to a contour enhancement process looks as if the character was significantly bordered. If the detection level of the contour to be enhanced is reduced for the purpose of preventing disconnection in the lines, the portion other than the thin lines of characters having a gentle image density gradient will also be determined as the contour portion of a character. Image noise will therefore be increased.

If a LOG correction is carried out on the image data read out by the CCD, the image noise in the region of high density is enhanced. Particularly in the case where the image data of the portion corresponding to the ridge of density for a line with a small width exhibits asperity (distribution is not uniform), this irregularity will be further deteriorated by the contour enhancement process. In the reproduced image, the thin line will become disconnected, in addition to the above-described problem.

There is also a problem that, when noise is included in the image, the noise will be eventually increased by the contour enhancement process.

In the latter, if the image is simply expanded, the configuration of the edge of the characters will be altered. When a contour enhancement process is carried out after the expansion process, there is a possibility that the resolution is degraded.

SUMMARY OF THE INVENTION

In view of the foregoing, an object of the present invention is to provide an image processing apparatus that allows appropriate contour enhancement of an image.

Another object of the present invention is to prevent reduction in the line width and disconnection in a line stroke of a character in an image, and bordering at the contour portion of an image and amplification of noise due to excessive contour enhancement in an image processing apparatus.

A further object of the present invention is to reliably prevent reduction in the line width and disconnection in a line stroke of a character in an image, and edging at the contour portion of an image and amplification of noise due to excessive contour enhancement in an image processing apparatus.

Still another object of the present invention is to suppress bordering at the contour portion of an image and noise amplification due to excessive contour enhancement in an image processing apparatus.

A still further object of the present invention is to provide an image processing method that allows appropriate contour enhancement of an image.

Yet a further object of the present invention is to prevent reduction in the line width and disconnection in a line stroke of a character and the like in an image, and prevent bordering at a contour portion of an image and noise amplification caused by excessive contour enhancement in an image processing method.

The above objects of the present invention can be achieved by an image processing apparatus including the following elements.

According to an aspect of the present invention, an image processing apparatus includes a contour enhancement unit for enhancing the contour of an image on image data constituted by successively input pixel data for providing contour enhanced image data, a first maximum value output unit for providing first maximum density data which is target pixel data in the contour enhanced image data substituted with the maximum density data in the target pixel data and surrounding pixel data, a first minimum value output unit for providing first minimum density data which is the target pixel data in the first maximum density data substituted with the minimum density data in the target pixel data and surrounding pixel data, a second minimum value output unit for providing second minimum density data which is the target pixel data in the contour enhanced image data substituted with the minimum density data in the target pixel data and surrounding pixel data, a second maximum value output unit for providing second maximum density data which is the target pixel data in the second minimum density data substituted with the maximum density data in the target pixel data and surrounding pixel data thereof, and a neighborhood selector receiving the first minimum density data and the second maximum density data for providing either the first minimum density data or the second maximum density data according to a predetermined condition.

In the first maximum value output unit, the density data of the target pixel data in the data output from the contour enhancement unit is substituted with the maximum value data in the target pixel data in the data output from the contour enhancement unit and the pixel data of the pixels surrounding the target pixel. In the first minimum value output unit, the density data of the target pixel data in the data output from the first maximum value output unit is substituted with the minimum value data (minimum density data) in the target pixel data in the data output from the first maximum output unit and in the surrounding pixel data. In the second maximum value output unit, the density data of the target pixel data in the data output from the contour enhancement unit is substituted with the minimum value data in the target pixel data in the data output from the contour enhancement unit and the surrounding pixel data. In the second maximum value output unit, the density data of the target pixel data in the data output from the second minimum value output unit is substituted with the maximum value data (maximum density data) in the target pixel data in the data output from the second minimum value output unit and the surrounding pixel data. The minimum density data and the maximum density data are applied to the neighborhood selector. Either the minimum density data or the maximum density data is output from the neighborhood selector according to a predetermined condition.

By virtue of the first maximum value output unit and the first minimum value output unit, a process of preventing disconnection in line strokes of a text image can be carried out on a pixel having a high density (tonal gradation). By virtue of the second minimum value output unit and the second maximum value output unit, a process can be carried out on pixels with low density (tonal gradation) so that reduction in resolution due to filling the valley between peaks of density in a text image can be prevented and so that an isolated point due to contamination in the image can be removed. By carrying out these processes selectively for each pixel according to a predetermined condition, thinning and disconnection of line strokes can be prevented. Also, reduction in resolution can be suppressed to allow removal of an isolated point due to contamination in the image. Since thinning and disconnection in line strokes can be prevented, it is not necessary to carry out excessive contour enhancement. Therefore, the bordering phenomenon at the contour on an image can be prevented.

Preferably, the predetermined condition is whether the density value of the target pixel data in the contour enhanced image data is at least a predetermined standard value. The neighborhood selector provides the first minimum density data when the density value of the target pixel data in the contour enhanced image data is at least the standard value, and provides the second maximum density data when below the standard data.

The neighborhood selector determines whether to output the data processed by the first maximum value output unit and the first minimum value output unit or the second minimum value output unit and the second maximum value output unit according to the density value of the target pixel data in the data output from the contour enhancement unit.

Therefore, disconnection in line strokes in a text image can be prevented for a pixel of high density in the pixel data. Also, for data of low density in the pixel data, reduction in resolution due to filling the valley between peaks of density in the text image can be prevented and an isolated point due to contamination in the image can be removed. Thus, thinning of the line width and disconnection in the line stroke can be prevented more reliably. Also, bordering at the contour of an image and noise amplification due to excessive contour enhancement can be reliably suppressed.

According to another aspect of the present invention, an image processing apparatus having a function of applying a contour enhancement process on image data constituted by succesively input pixel data to emphasize the contour of an image includes a thickening process unit for thickening pixel data by substituting target pixel data in the input pixel data with the maximum density data in the target pixel data and surrounding pixel data to output the maximum density data, a data adjustment unit for adjusting input pixel data in parallel to the thickening process, and a contour enhanced data output unit for providing contour enhanced data using the pixel data adjusted by the pixel data adjustment unit and the pixel data thickened by the thickening process unit.

The contour enhancement process is carried out by applying a thickening process on the input pixel data by the thickening process unit and applying a process for adjusting the data by the data adjustment unit, and then providing pixel data constituting image data subjected to contour enhancement using the data subjected to a thickening process and the adjusted data by the contour enhanced data output unit.

Since pixel data constituted by pixel data subjected to contour enhancement is output using input pixel data subjected to a process of adjusting the data and input pixel data subjected to a thickening process in contrast to the conventional input pixel data per se, the line width of a line stroke that is reduced due to the property of an image reader such as a CCD which is to have the contour enhanced can be thickened while leaving the contour property of the original image. Therefore, it is not necessary to excessively increase the amount of contour enhancement as in the conventional case. Bordering at the contour of an image and noise amplification due to excessive contour enhancement can be suppressed.

According to a further aspect of the present invention, an image processing method includes the steps of enhancing the contour of an image on image data constituted by successively input image data for providing contour enhanced image data, providing first maximum density data that is the target pixel data in the contour enhanced image data substituted with the maximum density data in the target pixel data and the surrounding pixel data, providing the first minimum density data that is the target pixel data in the first maximum density data substituted with the minimum density data in the target pixel data and the surrounding pixel data, providing the second minimum density data that is the target pixel data in the contour enhanced image data substituted with the minimum density data in the target pixel data and the surrounding pixel data, providing the second maximum density data which is the target pixel data in the second minimum density data substituted with the maximum density data in the target pixel data and the surrounding pixel data, and providing either the first minimum density data or the second maximum density data according to a predetermined condition.

According to still another aspect of the present invention, an image processing method of carrying out a contour enhancement process on pixel data constituted by successively input pixel data to enhance the contour of an image includes the steps of thickening pixel data by substituting the target pixel data in the input pixel data with the maximum density data in the target pixel data and the surrounding pixel data to output the maximum density data, adjusting the input pixel data in parallel to the thickening process, and providing contour enhanced data using the adjusted pixel data and the thickened pixel data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a Laplacian filter used in the region determination/MTF correction unit of the first embodiment.

FIGS. 5A–5C are diagrams for describing the unsharp mask effect by a contour enhancement process by the region determination/MTF correction unit of the first embodiment.

FIGS. 6A and 6B are diagrams showing a primary differential filter used in the region determination/MTF correction unit of the first embodiment.

FIG. 7 is a diagram for describing the condition of determining a pixel as an isolated point in the first embodiment.

FIGS. 11A–11F are diagrams for describing a mask process in a mask process unit.

FIGS. 13A and 13B are diagrams for describing minimum value detection in a minimum value detection circuit.

FIG. 15 is a block diagram of an LD drive unit.

FIGS. 19A–19F are diagrams for describing a mask process by a mask process unit.

FIG. 20 shows the result of a contract process by the mask process of the mask process unit.

FIGS. 21A and 21B are diagrams for showing the effect of the process by a neighborhood select circuit.

FIGS. 24A and 24B show the effect of a process by a neighborhood maximum value-minimum value circuit.

FIGS. 31A–31C are diagrams for describing an example of a mask process by a mask process unit.

FIGS. 32A and 32B are diagrams for describing an example of maximum value detection in a maximum value detection unit.

FIG. 33 is a block diagram of a thinning process unit.

FIGS. 35A–35C are diagrams for describing an example of a mask process by a mask process unit.

FIGS. 36A and 36B are diagrams for describing an example of minimum value detection in a minimum value detection unit.

FIG. 37 is a block diagram of a MTF correction unit of FIG. 5.

FIGS. 41A–41E show an example of a process of region determination in a region determination unit of the fifth embodiment.

DESCRIPTION OF THE PREFERRED EMBODIMENTS (1) First Embodiment

A digital copy machine including an image processing apparatus of the present invention will be described hereinafter with reference to the drawings.

Figure 1:
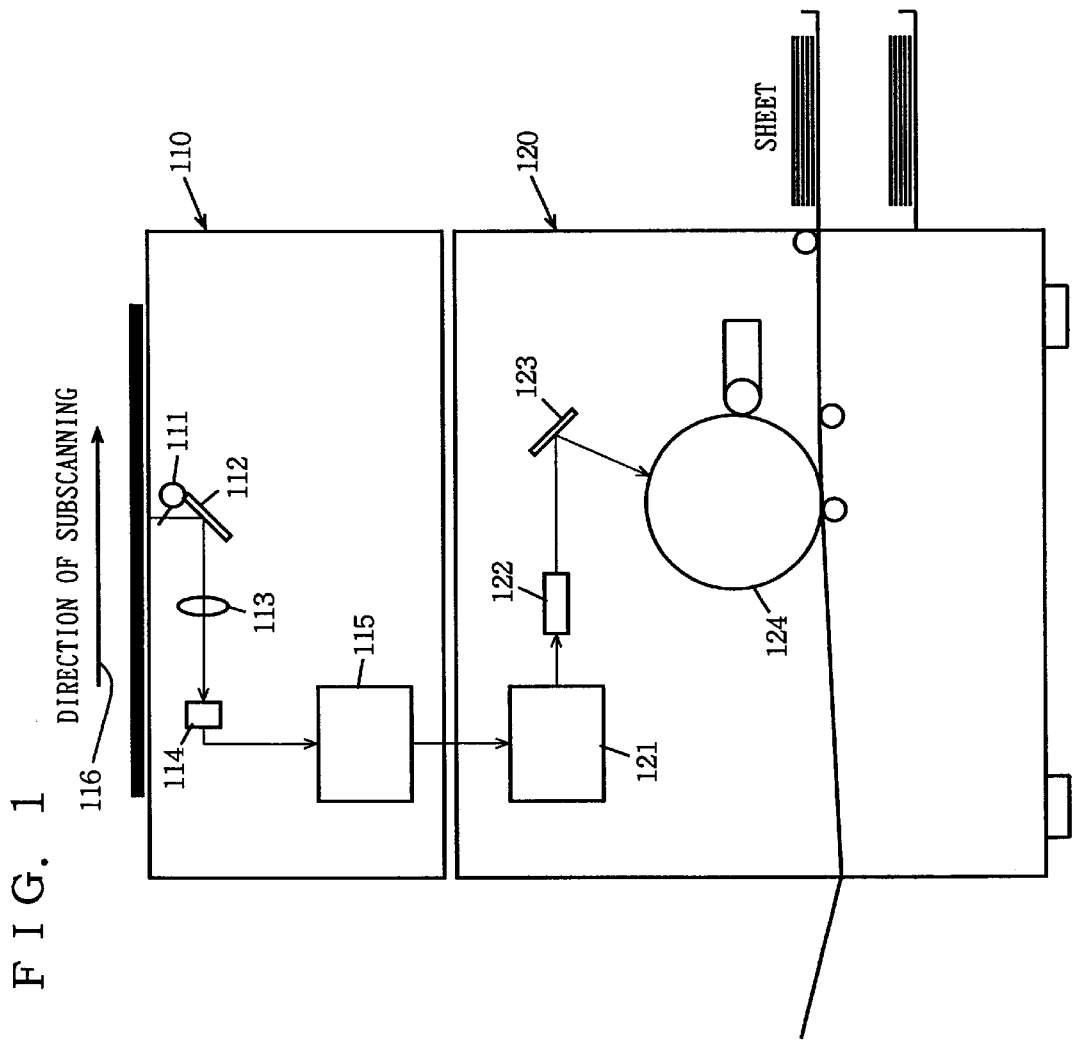
FIG. 1 is a block diagram of a digital copy machine including an image processing apparatus according to the present invention.

Referring to FIG. 1, a digital copy machine is formed mainly of an upper image reader (image scanner) 110 and a lower image recorder (printer) 120. Image reader 110 carries out a readout operation on an original to transfer the result to image recorder 120 as image data. Image recorder 120 reproduces the original image according to the transmitted image data.

Image reader 110 employs a reduction optical system to issue a beam on an original document from a light source 111 to direct the reflected light from the original plane via a mirror 112 and a lens 113 onto linear CCD (Charge Coupled Device) 114. As a result, photoelectric-converted analog electrical signals are obtained. The resolution of the employed CCD 114 is 400 dpi (dots per inch), for example. The corresponding maximum original size is A3 (approximately 500 dots).

The analog electric signal formed by CCD 114 is sent to image processing unit 115. In image processing unit 115, the signal is converted into digital data and then subjected to an appropriate image process such as magnification variation and image correction to be sent to image recorder 120 as digital image data.

When the direction perpendicular to the sheet plane is defined as the main scanning direction, and the direction of arrow 116 above image reader 110 in FIG. 1 and perpendicular to the main scanning direction is defined as the subscanning direction, image reader 110 reads the original in the main scanning direction by electrical scanning of CCD 114 and in the subscanning direction by moving mirror 112 horizontally. The image data is sequentially transferred from CCD 114 to image processing unit 115 for every one line of the main scanning operation.

In image recorder 120, the digital image data output from image reader 110 is converted into an analog signal by a laser diode (abbreviated as LD hereinafter) drive unit 121. The analog signal is further converted into a photosignal by a laser luminous source 122 to form an image on photoconductor drum 124 via a polygon mirror 123. LD drive unit 121 provides control of the current output to laser luminance source 122 for each pixel, whereby the amount of light of laser luminance source 122 and the attached amount of toner are controlled. According to the recording method of the electrophotographic system, an image is reproduced on photoconductor drum 124 at 400 dpi and in 256 gray scale levels.

Figure 2:
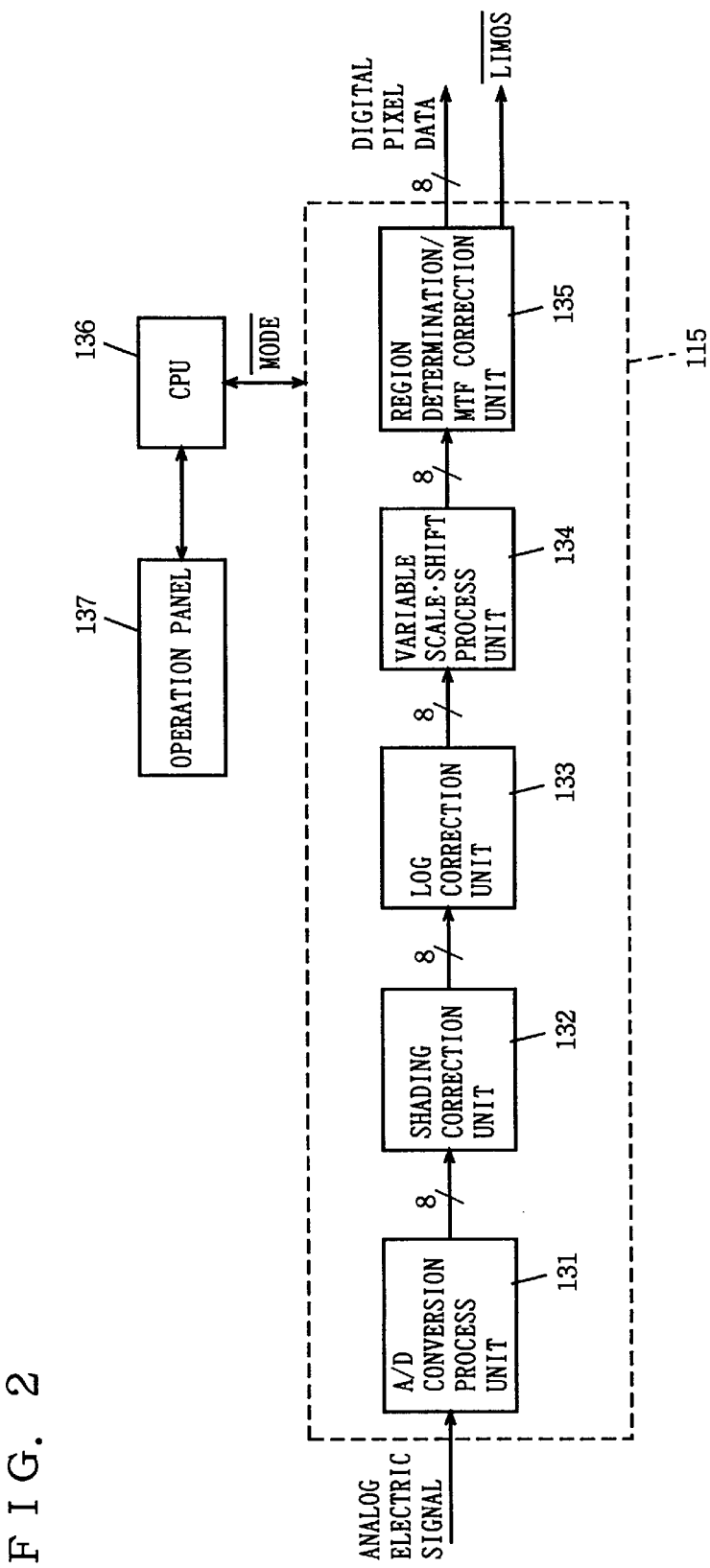
FIG. 2 is a block diagram of an image processing unit in an image reader.

The image process of the entire image processing unit 115 will be described briefly hereinafter. Referring to the block diagram of FIG. 2 showing image processing unit 115 in image reader 110, an analog electric signal from CCD 114 is eventually output as digital image data.

Data conversion by image processing unit 115 will be described hereinafter. Referring to FIG. 2, an A/D conversion process unit 131 has the analog electric signal that is photoelectric-converted by CCD 114 converted into digital data by an A/D converter at the precision of 8 bits per pixel (256 gray scale levels).

A shading correction unit 132 carries out a process to remove unevenness in the quantity of light in the main scanning direction on the image with the digital data converted by A/D conversion process unit 131.

In a LOG correction unit 133, LOG conversion is carried out using a lookup table to obtain image data of the density scale. In CCD 114, the quantity of input light is proportional to the value of the output voltage. The following relationship is established between the density value and the lightness value.

(Density value)=$c\{-\log$ (lightness value)$\}$ c: a constant

For implementation thereof, table conversion is carried out with the lightness value as the input value in the lookup table and the density value as the output value.

In a variable scale shift process unit 134, a variable scale.shift process in the main scanning direction is carried out by using two line memories to alternately switch between an input operation and an output operation for every one main scanning line and controlling independently the write timing and read timing. The scale variation in the subscanning direction is carried out by controlling the shifting speed of the mirror, i.e. the read speed. A scale magnification process is carried out at the time of writing into a memory and a reduction process is carried out at the time of reading out from a memory. For the purpose of preventing a missing portion or unevenness in the image, a data interpolation process is carried out according to the variable scale rate. More specifically, data interpolation is carried out before writing into a memory for reduction and after reading out from a memory for magnification. Particular processes such as image repeat, magnified continuous copy, and mirror image process can be carried out by a combination of these processes.

In region determination/MTF correction unit 135, determination is made of which type the image of the original belongs to (text image, picture image) from the feature of the image. Correction such as of the sharpness in the image (MTF: Modulation Transfer Function correction) is carried out according to the determined attribute. The region determination is carried out for each pixel. More specifically, determination is made whether each pixel forming the image belongs to the region of the type of text.line copy (text image) or pictorial.continuous tone image (photographic image). Switching is effected between a state of carrying out and not carrying out a contour enhancement process on each pixel forming the image according to the determination result. If the pixel corresponds to the text.line copy type, a $\overline{\text{LIMOS}}$ signal is generated as a signal to indicate the text.line copy portion. The $\overline{\text{LIMOS}}$ signal is output together with the digital image data. This signal is also used as a gray scale reproduction switching signal in LD drive unit 121.

Image processing unit 115 is connected to a CPU 136 that provides the overall operation of the digital copy machine of the present invention. The operation of image processing unit 115 is under control of CPU 136. An operation panel 137 provided to enter various processes by an operator for adding a desired image process manner in the copy operation is connected to CPU 136.

The structure of region determination/MTF correction unit 135 will be described hereinafter with reference to FIG. 3. In region determination/MTF correction unit 135, an appropriate process such as a smoothing process and a contour enhancement process is applied on the input image signal (DC7-0) depending upon the determination result of whether the target pixel corresponds to the contour portion of a character and the like or to a dot image. Then, a neighborhood maximum value-minimum value process and a neighborhood minimum value-maximum value process that will be described afterwards is carried out on the obtained data (DC27-20; the data output from adder 316) by neighborhood select circuit 317. By this structure, the problem of disconnection in the line stroke of text data due to density linear data from CCD 114 in image reader 110 of the copy machine is to be improved.

The region determination method and MTF correction method carried out by region determination/MTF correction unit 135 will be described hereinafter. In region determination/MTF correction unit 135, input data (DV37-30) from variable scale-shift process unit 134 is sent to four line memories 301 connected successively to sequentially obtain an image signal (DA7-0, DB7-0, DC7-0, DD7-0, DE7-0) of 5 lines delayed by the step of each one line. The data group of 5 lines is applied to a Laplacian filter 302, primary differential filters 303a and 303b, and an isolated point detection filter 309. Image data (DC7-0) including the target pixel data is provided to input B of a selector A 313 and to smoothing filter 314.

In Laplacian filter 302, a manipulated result (ETG7-0) is obtained using a filter as shown in FIG. 4. This filter is a spatial filter employed in order to increase the contrast of the contour of an image and the sharpness of the image (unsharp mask effect). The unsharp mask effect by the contour enhancement process using the spatial filter will be described with reference to FIGS. 5A–5C.

FIG. 5A shows the original image data. FIG. 5B shows the manipulated result of the original image data of FIG. 5A using a Laplacian filter of FIG. 4. FIG. 5C shows the result of adding the manipulated result of FIG. 5B to the original image data of FIG. 5A. By adding the manipulated result using the filter of FIG. 4 to the original image data, the contrast of the contour portion of the image can be increased so that the image appears sharper.

In primary differential filters 303a and 303b, the density gradient of the image in the main scanning and subscanning direction is detected using the filter shown in FIGS. 6A and 6B to be output. The filter shown in FIGS. 6A is used as primary differential filter 303a. The detected result is data FLA7-0. The filter shown in FIG. 6B is used as primary differential filter 303b. The detected result is data FLB7-0.

In absolute value calculators 304a, 304b and 304c, the absolute value of each data (EDG7-0, FLA7-0, FLB7-0) output from Laplacian filter 302, primary differential filters 303a and 303b, respectively, is calculated. Then, the average (FLI17-10) of the two absolute values of the output data (FLA7-0, FLB7-0) of primary differential filters 303a and 303b is calculated by an average value calculator 305. The average value is then output. In maximum value detector 306, the maximum value (FL37-30) of the average value (FL17-10) and the absolute value (FL27-20) of the output data of Laplacian filter 302 is selected and output. The output data (FL37-30) of maximum value detector 306 is the contour determination data used in determining whether the target pixel corresponds to the contour portion of a character or not.

A Laplacian filter is sensitive to a line stroke of less than 100 μm whereas a primary differential filter is sensitive to a line width greater than 100 μm. This is the reason why the contour determination data (FL37-30) is calculated using the absolute value (FL27-20) of the output data of Laplacian filter 302 and the average value (FL17-10) of the two absolute values of the output data (FLA7-0, FLB7-0) of primary differential filters 303a and 303b.

Comparator A 307 compares the contour determination data (FL37-30) with the predetermined threshold value (REF27-20) output from output port 308a to determine whether the target pixel corresponds to the contour portion of a character and the like. Comparator A 307 provides an $\overline{ELG}$ signal of an H or L level as the determination result. Here, it is defined that signal $\overline{EDG}$ of an H level indicates that the target pixel corresponds to the contour portion and an L level corresponds to a portion other than the contour portion.

Isolated point detection filter 309 is a filter to isolate the core image (kernel) of each dot that is always present at a constant period within a halftone original for the purpose of determining whether the original is represented in gray levels of a dot screen such as in halftone printing.

The condition of determining a pixel as an isolated point will be described with reference to FIG. 7. In a matrix of 5×5 pixels, the positions of $a_{11}$–$a_{55}$ are defined as shown in FIG. 7. When $a_{11}$–$a_{55}$ satisfy the following condition, a KAMI signal or a WAMI signal is determined.

$$\max(a_{22}, a_{23}, a_{24}, a_{32}, a_{33}, a_{34}, a_{42}, a_{43}, a_{44}) = a_{33} \tag{1}$$

$$a_{33} \geq (a_{11} + a_{22})/2 + \text{Ref7-0} \tag{2}$$

$$a_{33} \geq (a_{31} + a_{32})/2 + \text{Ref7-0} \tag{3}$$

$$a_{33} \geq (a_{42} + a_{51})/2 + \text{Ref7-0} \tag{4}$$

$$a_{33} \geq (a_{43} + a_{53})/2 + \text{Ref7-0} \tag{5}$$

$$a_{33} \geq (a_{44} + a_{55})/2 + \text{Ref7-0} \tag{6}$$

$$a_{33} \geq (a_{34} + a_{35})/2 + \text{Ref7-0} \tag{7}$$

$$a_{33} \geq (a_{15} + a_{24})/2 + \text{Ref7-0} \tag{8}$$

$$a_{33} \geq (a_{13} + a_{23})/2 + \text{Ref7-0} \tag{9}$$

When the above equations (1)–(9) are all satisfied, KAMI="L".

$$\min(a_{22}, a_{23}, a_{24}, a_{32}, a_{33}, a_{34}, a_{42}, a_{43}, a_{44}) = a_{33} \tag{10}$$

$$a_{33} \leq (a_{22} + a_{11})/2 - \text{Ref7-0} \tag{11}$$

$$a_{33} \leq (a_{32} + a_{31})/2 - \text{Ref7-0} \tag{12}$$

$$a_{33} \leq (a_{42} + a_{51})/2 - \text{Ref7-0} \tag{13}$$

$$a_{33} \leq (a_{43} + a_{53})/2 - \text{Ref7-0} \tag{14}$$

$$a_{33} \leq (a_{44} + a_{55})/2 - \text{Ref7-0} \tag{15}$$

$$a_{33} \leq (a_{34} + a_{35})/2 - \text{Ref7-0} \tag{16}$$

$$a_{33} \leq (a_{24} + a_{15})/2 - \text{Ref7-0} \tag{17}$$

$$a_{33} \leq (a_{23} + a_{13})/2 - \text{Ref7-0} \tag{18}$$

When the above equations (10)–(18) are all satisfied, WAMI="L".

The above conditions are due to the fact that, since the kernel of a dot is present in both black/white, the surrounding pixels all have a density greater or lower than that of the core pixel, and that all are greater or smaller than the average density of the eight surrounding pixels by a certain level (in this case, REF7-0 output from output port 308b). When determination is made of a white isolated point, WAMI=L is output to isolated point counter 310b. When determination is made of a black isolated point, KAMI=L is output to isolated point counter 310a.

Isolated point counters 310a and 310b independently count the number of KAMI=L and WAMI=L in a certain rectangular region (main scan: 41 dots/subscan 9 lines). Then, selector 311 selects the greater of the number of isolated points (KCNT7-0, WKNT7-0) and outputs the isolated point count (CNT7-0).

When the isolated point count (CNT7-0) is greater than the threshold value (REF17-10) output from output port 308c, comparator B 312 determines that the target pixel is a pixel in a halftone region, and provides $\overline{AMI}$=L.

When this threshold value (REF17-10) is defined as in the following, ascreen ruling: X screen angle: θ number of dots of main-subscan determination region: X1, Y1 prime of readout resolution (dots per inch): 400, the following equation is established.

$$REF17\text{-}10 \geq INT[(X*\cos \theta * X1/400)*(X*\sin \theta * Y1/400)]$$

Therefore, the following threshold value is achieved when θ=45° (general screen angle).

When screen ruling=65, REF17-10≧4

When number of screen rulings=100, REP17-10≧11

Input pixel data (DC7-0) is applied to selector A 313 and smoothing filter 314 as described above. A smoothing filter is one type of a low pass filter to smooth the image. Smoothing filter 314 of the present invention applies an integration process (weighted mean) on three pixels in the main scanning direction in the order of the ratio of 1/4, 1/2 and 1/4 to output data (SDC7-0) having the high frequency component that becomes the cause of moire cut.

As described with reference to FIG. 3, corrected data with respect to the input pixel data by Laplacian filter 302 or smoothing filter 314 is selected as described below to be eventually applied to neighborhood select circuit 317 according to signal $\overline{AMI}$ and signal $\overline{EDG}$ of the halftone determination result.

When halftone dot determination signal $\overline{AMI}$ applied to input S of selector A 313 attains an L level, i.e. when determination is made that the target pixel is a pixel in the halftone dot region, selector A 313 selects SDC7-0 of input A having the high frequency component of the image cut. The selected data is output as DF7-0. Selector A313 selects DC7-0 when halftone dot determination signal $\overline{AMI}$ attains an H level.

In selector B 315, halftone dot determination signal $\overline{AMI}$ and signal $\overline{EDG}$ which is the contour detection result are applied to input S via an AND circuit 300. When signal $\overline{AMI}$ attains an L level or signal $\overline{EDG}$ attains an H level, data 00 from output port 308d is selected to clear the contour enhanced amount data (EDG7-0) from Laplacian filter 302. The selected data is output as EDG 17-10.

When signal $\overline{AMI}$ attains an H level and signal $\overline{EDS}$ attains an L level, EDG7-0 is output as EDG17-10. More specifically, when determination is made that the target pixel is a pixel within the halftone dot region, or when determination is made that the target pixel does not correspond to the contour portion of a character and the like, the contour enhancement process carried out by Laplacian filter 302 is canceled.

The output result (DC7-0) of selector A313 and the output result (EDG17-10) of selector B315 are added by adder 316. The result thereof (DC27-20) is applied to neighborhood select circuit 317. Pixel data (DV47-40) from neighborhood select circuit 317 is applied to image recorder 120 (refer to FIG. 1).

The signal applied to input S of selector B 315 via AND circuit 300 is output as a tone reproduction switching signal ($\overline{LIMOS}$ signal). Here, signal $\overline{LIMOS}$ is a signal including the information of whether the target pixel corresponds to the contour portion of a character.

The output value from each of output ports 308a–308d is controlled by CPU 137 (refer to FIG. 2).

Figure 8:
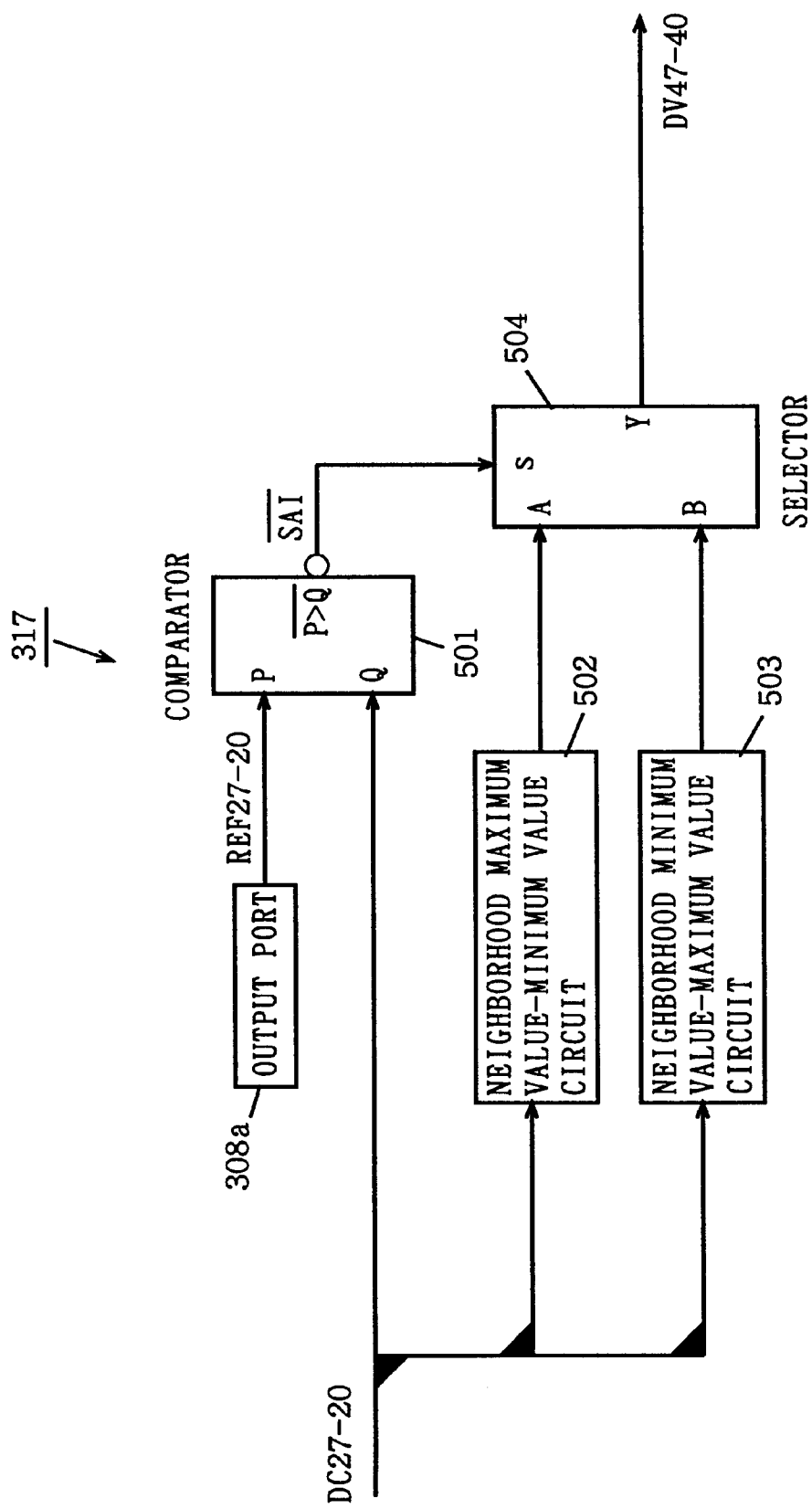
FIG. 8 is a block diagram of a neighborhood select circuit of the first embodiment of the present invention.

The processing step of pixel data (DC27-20) applied to neighborhood select circuit 317 will be described hereinafter with reference to the block diagram of FIG. 8.

Pixel data (DC27-20) is applied to a comparator 501, a neighborhood maximum value-minimum value circuit 502, and a neighborhood minimum value-maximum value circuit 503.

Comparator 501 compares the threshold value (REF27-20) applied from output port 308a with the input pixel data (DC27-20) to determine whether the pixel data (DC27-20) is high density pixel data or low density pixel data and provides a signal $\overline{SAI}$. Here, it is defined that signal $\overline{SAI}$ of an H level indicates high density pixel data and a L level indicates low density pixel data. Signal $\overline{SAI}$ is applied to input s of selector 504. The threshold value is determined and stored as a table representing REF27-20. More specifically, the value is determined by which a thin line will not be disconnected. A plurality set of threshold values are stored in a memory. The threshold value output from output port 308a is controlled by CPU 137 (refer to FIG. 2).

The processed result of neighborhood maximum value-minimum value circuit 502 is applied to input A of selector 504. The processed result of neighborhood minimum value-maximum value circuit 503 is applied to input B of selector 504.

Selector 504 responds to the input signal from comparator 501 to provide the processed result of either neighborhood maximum value-minimum value circuit 502 or neighborhood minimum value-maximum value circuit 503 as output data (DV47-40). Since signal $\overline{SAI}$ of an H level indicates that the pixel data is of a high density level, an image that has the line stroke disconnected or thinned is corrected as will be described in detail afterwards by selecting and providing the pixel data that is processed by neighborhood maximum value-minimum value circuit 502. Signal $\overline{SAI}$ of an L level indicates that the pixel data is of a low density level. Therefore, by selecting and providing the pixel data processed by neighborhood minimum value-maximum value circuit 503, reduction in the resolution will be prevented. Also, an isolated point due to contamination in the image can be removed and unevenness in the line strokes can be corrected.

Figure 9:
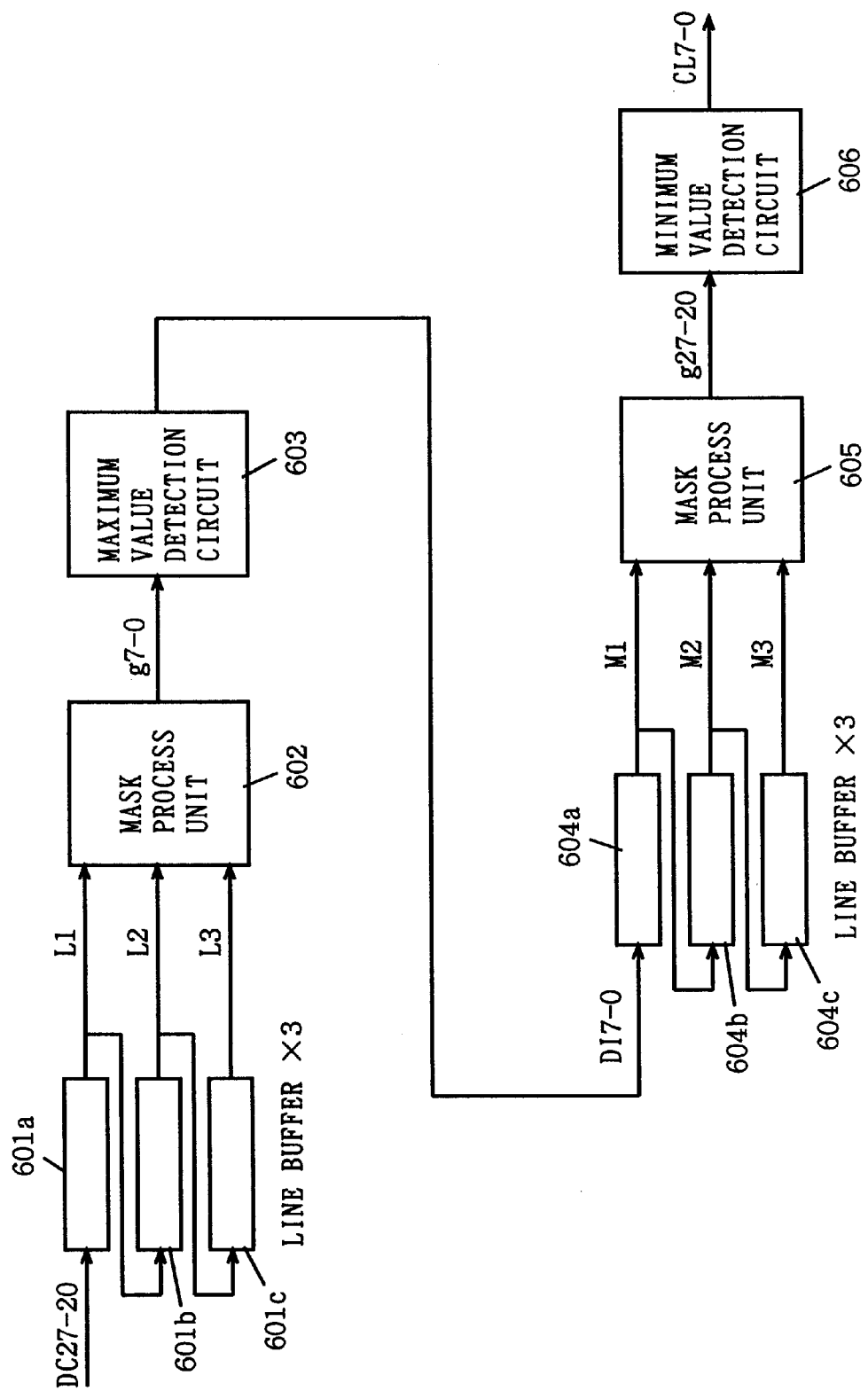
FIG. 9 is a block diagram of a neighborhood maximum value-minimum value circuit.

FIG. 9 shows a block diagram of neighborhood maximum value-minimum value circuit 502. Input data (DC27-20) is applied to three line buffers 601a, 601b and 601c provided successively to sequentially obtain pixel signals (L1, L2, L3) of 3 lines delayed by every 1 line. A mask process that will be described afterwards is applied on the data group of these three lines in mask process unit 602.

The mask process of mask process unit 602 will be described with reference to FIGS. 11A–11F. From the pixel signals (L1, L2, L3)of three lines, image data g(i, j) (where i=1~3, j=1~3) of 3×3 pixels as shown in FIG. 11A or 11D are obtained. Using 3×3 mask data a(i, j) (where i=1~3, j=1~3) in which respective data is preset to "00" and "01" as shown in FIG. 11B or 11E, each corresponding data within the 3×3 matrix is multiplied. The product g(i, j)·a(i, j) (where i=1~3, j=1~3) is output as the result of the mask process (refer to FIG. 11C or 11F). The output data is applied to maximum value detection circuit 603.

Maximum value detection circuit 603 detects the maximum value in the 3×3 matrix, which is provided as output data (DI7-0). When data as shown in FIG. 11F is applied to maximum value detection circuit 603, DI7-0=10.

Data (DI7-0) output from maximum value detection circuit 603 is applied again to three line buffers 604a, 604b and 604c connected successively to obtain pixel signals of 3 lines (M1, M2, M3) that is delayed for every 1 line. A mask process is carried out using the data group of these three lines in mask process unit 605.

The mask process of mask process unit 605 is set forth in the following. In the mask process described above with reference to FIGS. 11A–11F, data "00" is converted into "256" in the 3×3 mask data a(i, j) (where i=1~3, j=1~3) in which each data is preset to "00" and "01" as shown in FIG. 11B or 11E. Then, each corresponding data within the 3×3 matrixes is multiplied to provide g(i, j)·a(i, j) to minimum value detection circuit 606 as the mask processed result (g27-20).

In minimum value detection circuit 606, the minimum value in the 3×3 matrix is detected and provided as output pixel data. The data output from minimum value detection circuit 606 through the above-described process is output as output pixel data (CL7-0) of neighborhood maximum value-minimum value circuit 502.

Figure 10:
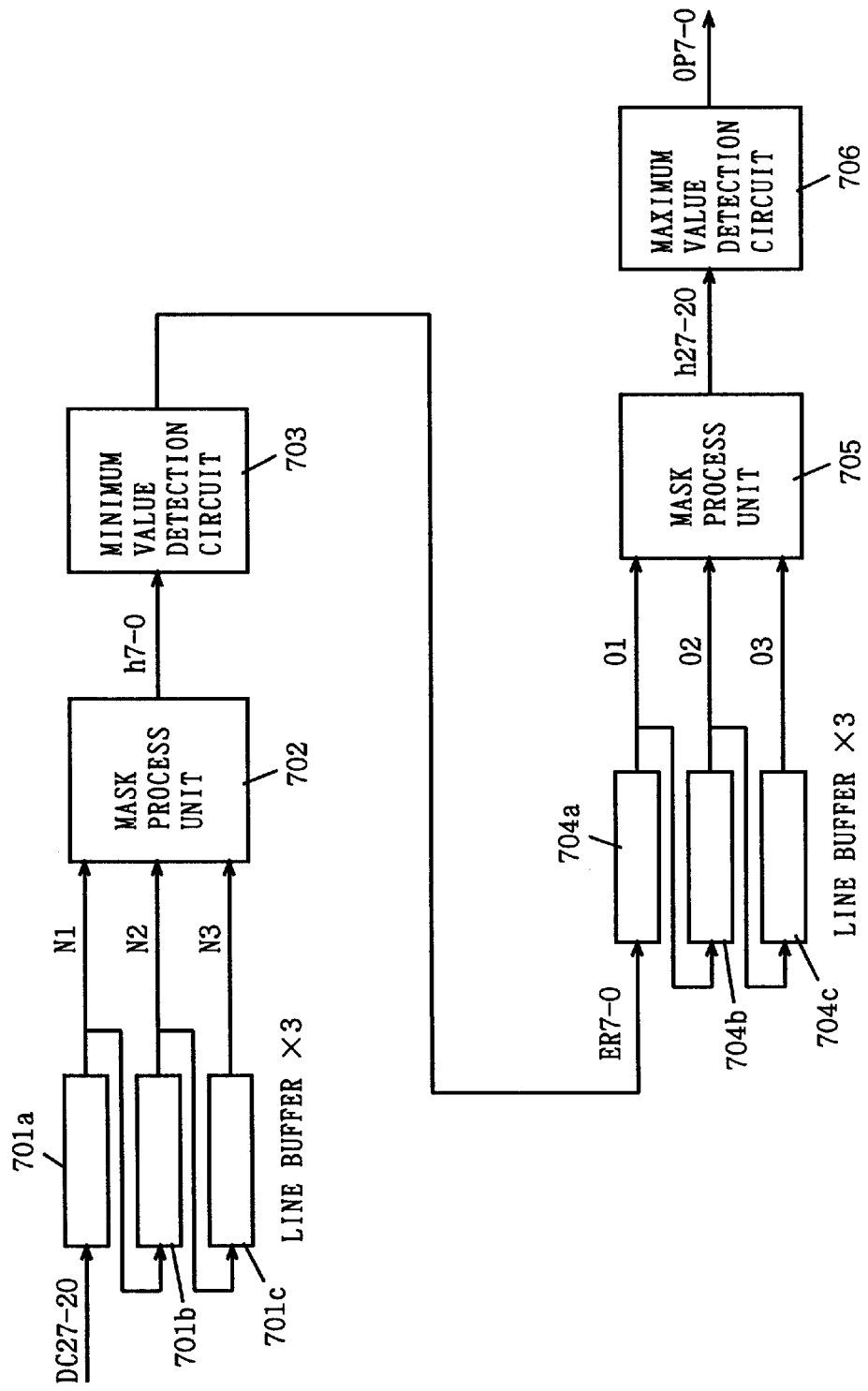
FIG. 10 is a block diagram of a neighborhood minimum value-maximum value circuit.

FIG. 10 is a block diagram of neighborhood minimum value-maximum value circuit 503. Input data (DC27-20) is applied to three line buffers 701a, 701b and 701c provided successively to sequentially obtain pixel signals of 3 lines (N1, N2, N3) delayed by every one line. A mask process is carried out using the data group of the three lines in mask process unit 702. The mask process carried out by mask process circuit 702 is similar to that carried out by mask process unit 605. Therefore, the description thereof will not be repeated.

The 3×3 matrix data (h7-0) subjected to a mask process by mask process unit 702 is applied to minimum value detection circuit 703. Minimum value detection circuit 703 detects the smallest of the input data (h7-0) and provides the same as output data (ER7-0).

The output data (ER7-0) of minimum value detection circuit 703 is applied to three line buffers 704a, 704b and 704c provided successively to sequentially obtain pixel signals of three lines (O1, O2, O3) delayed by every one line. These signals are subjected to a mask process in mask process unit 705. The mask process carried out by mask process unit 705 is similar to that of mask process unit 602. Therefore, description thereof will not be repeated.

The output data (h27-20) from mask process unit 705 is applied to maximum value detection circuit 706. Maximum value detection circuit 706 detects the greatest value in the 3×3 matrix of the output data (h27-20) from mask process unit 705. The detected maximum value is provided as output data (OP7-0) from neighborhood minimum value-maximum value circuit 503.

Detection of the maximum value carried out in maximum value detection circuit 603 (refer to FIG. 9) or maximum value detection circuit 706 will be described hereinafter.

Figure 12B:
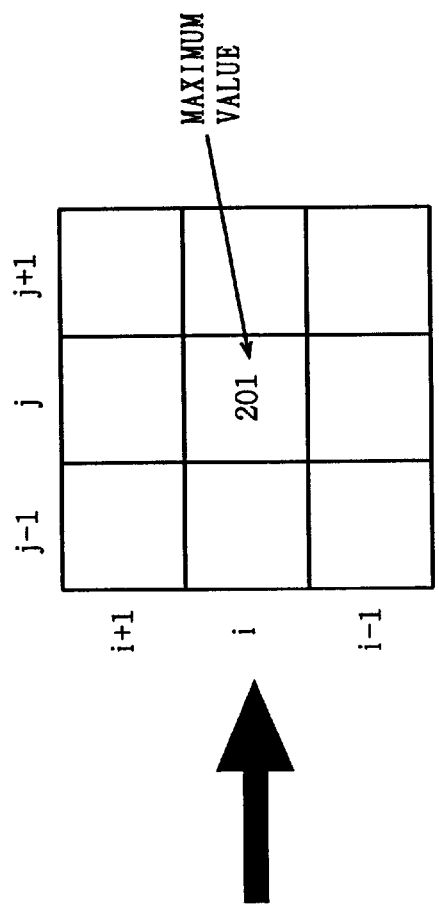
FIGS. 12A and 12B are diagrams for describing maximum value detection in a maximum value detection circuit.
Figure 12A:
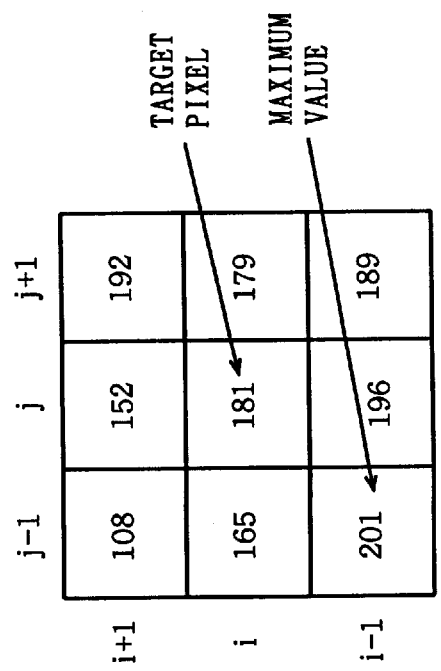

FIGS. 12A and 12B are diagrams for describing detection of a maximum value in 3×3 pixels. FIG. 12A shows pixel data prior to a maximum value detection process. FIG. 12B shows the pixel data after the maximum value detection process. The matrix of 3×3 pixels shown in FIG. 12A is an extraction of data X1(m, n) (m=i−1, i, i+1, n=j−1, j, j+1) of the surrounding pixels centered about core pixel (i. j). The pixel data indicating the maximum value in these data is found in the maximum value detection process. As shown in FIG. 12B, the obtained maximum value is replaced as the data of the position where the target pixel is present in FIG. 12A. For example, in the matrix of FIG. 12A, the data of the target pixel is "181", and the maximum value of the surrounding pixels is "101" at the pixel position of (i−1, j−1). Therefore, the pixel data at the position of the target pixel (i, j) is replaced with "201".

Detection of a minimum value carried out by minimum value detection circuit 606 (refer to FIG. 9) or minimum value detection circuit 703 (refer to FIG. 10) will be described hereinafter.

FIGS. 13A and 13B are diagrams for describing detection of a minimum value in 3×3 pixels. FIG. 13A shows pixel data prior to a minimum value detection process. FIG. 13B shows pixel data after a minimum value detection process. The matrix of the 3×3 pixels of FIG. 13A is an extraction of data X2(m, n) (m=i−1, i, i+1, n=j−1, j, j+1) of the neighboring pixels centered about core pixel (i, j). In the minimum value detection process, the pixel data indicating the minimum value in these data is found. As shown in FIG. 13B, the obtained minimum value is replaced as the data of the position where the target pixel is located in FIG. 13A. In the matrix of FIG. 13A, for example, the data of the target pixel is "150", and the minimum value in the surrounding pixel is "32" at the pixel position of (i−1, j+1). Therefore, the pixel data at the position of the target pixel (i, j) is replaced with "32" in FIG. 13B.

According to neighborhood maximum value-minimum value circuit 502, the above-described maximum value detection process is carried out on the input pixel data. Then, the minimum value detection process is carried out on the processed result. By these series of processes, an image having line strokes disconnected or thinned can be corrected. This process is particularly effective for pixel data determined as having a high density level by comparator 501 (refer to FIG. 8).

According to neighborhood minimum value-maximum value detection circuit 503, the above-described minimum value detection process is carried out on the input pixel data, followed by the minimum value detection process on the processed result. By the series of processes, reduction in the resolution can be prevented. Also, an isolated point due to contamination in the image can be removed. Furthermore, unevenness in the line strokes can be corrected. This process is particularly effective for pixel data determined as having a low density value by comparator 501 ( FIG. 8).

The advantage of the present invention in text image processing will be described with reference to FIGS. 14A–14D.

Figure 14A:
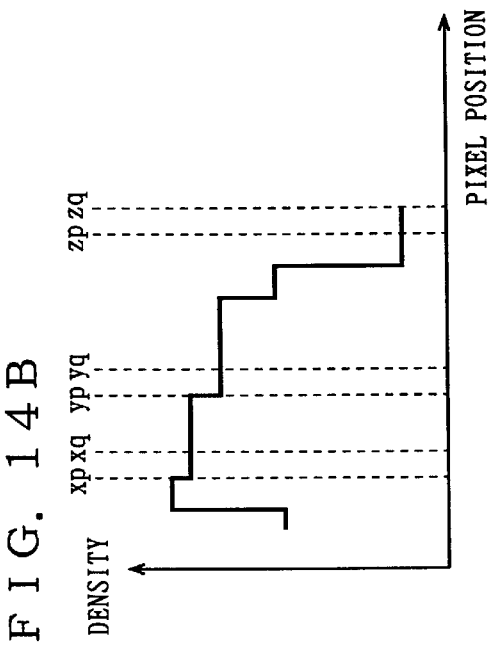
FIGS. 14A–14D are diagrams for describing the effect of a process in the neighborhood select circuit.

FIG. 14A shows the density distribution for the pixel positions of the pixel data input into neighborhood select circuit 317 (refer to FIG. 3) in a two dimensional manner. In FIG. 14A, the text image is mixed with a low density portion (xp–xq in FIG. 14A) where the density is partially reduced corresponding to disconnection in line strokes and blur due to the influence of the readout accuracy of the image reader and the density linear data of the CCD data by LOG correction, and a low density portion (yp–yq in FIG. 14A) corresponding to the valley between the peaks of high density data originally retained by the text image.

Figure 14B:
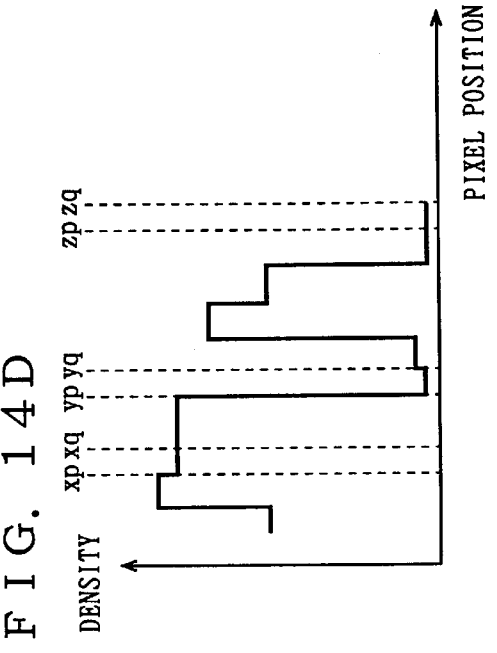

FIG. 14B shows the result of the input pixel data entirely processed by neighborhood maximum value-minimum value circuit 502. By this process, the low density portion (xp—xp in FIG. 14A) corresponding to disconnection in line strokes due to the causes described with reference to FIG. 14A can be increased in density (xp–xq in FIG. 14B) by the high density data in the surrounding pixels. However, the original low density portion (yp–yq in FIG. 14A) corresponding to the valley between the peaks of high density of the text image will have the valley, if extremely narrow, be filled by the surrounding high density data to induce the problem of reduction in resolution in appearance (yp–yq in FIG. 14B). There is also the problem that the contamination present in the background is increased (zp–zq in FIG. 14B) since the portion of the density caused by contamination and the like present in the background in which the surrounding pixel has a low density level (zp–zq in FIG. 14A) replaces the surrounding low density portion.

Figure 14C:
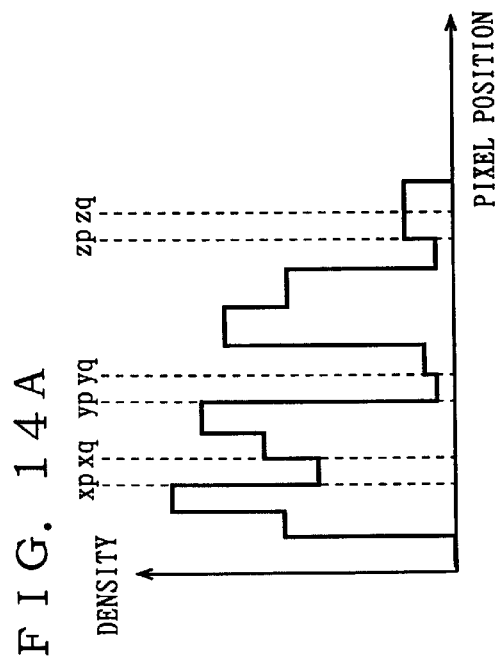

FIG. 14C shows the result of the entire input pixel data processed by neighborhood minimum value-maximum value circuit 503. By this process, the original low density portion of the valley between the peaks of the high density in the text image (xp–xq in FIG. 14A) can be corrected (zp–zq in FIG. 14C) without having the valley (low density portion) filled with the neighboring high density data (xp–xq in FIG. 14C) and by having the portion of the density corresponding to contamination present in the background where the neighboring pixel has low density (zp–zq in FIG. 14A) replaced with the surrounding low density portion. However, this process will produce a thinner character since the original pixel of high density is replaced with the low density data of the neighboring pixel.

Figure 14D:
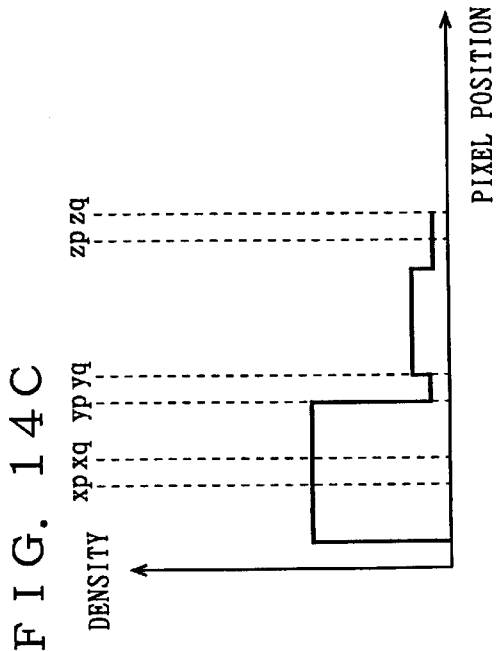

FIG. 14D shows the result of selector 504 where the input pixel data is processed by neighborhood maximum value-minimum value circuit 502 or neighborhood minimum value-maximum value circuit 503 according to signal $\overline{SAI}$ from comparator 501. More specifically, the process is carried out so that the pixel data subjected to the series of the neighborhood maximum value-minimum value process by neighborhood maximum value-minimum value circuit 502 is output when the target pixel corresponds to pixel data of a high density, and the pixel data subjected to the series of neighborhood minimum value-maximum value process by neighborhood minimum value-maximum value circuit 503 is output when the target pixel corresponds to pixel data of a low density. According to such a process, reduction in the density caused by disconnection in line strokes and blur can be corrected (xp–xq in FIG. 14D) since a neighborhood maximum value-minimum value process is carried out for the high density portion of the input image. For the low density portion in the input image, a neighborhood minimum value-maximum value process is carried out. Therefore reduction in resolution is prevented (yp–yq in FIG. 14D) caused by the valley between peaks of the tonal gradation (low density portion) retained originally by the text image being filled by the high density data of the adjacent peaks. Furthermore, pixels having a density corresponding to contamination in the background between characters can simultaneously be removed (zp–zq in FIG. 14D).

LD drive unit 121 of image recorder 120 (refer to FIG. 1) will be described hereinafter with reference to the block diagram of FIG. 15. Digital image data (DV47-40) entered from image processing unit 115 (refer to FIG. 1) is converted by a γ conversion process unit 141. One is directly applied to terminal A of a selector 143 as DA7-0, whereas the other is applied to terminal B of selector 143 as DS7-0 via a multi-line screen process unit 142. Signal $\overline{\text{LIMOS}}$ is applied to input terminal S of selector 143 from region determination/MTF correction unit 135 (refer to FIG. 2).

γ conversion process unit 141 carries out a nonlinear conversion using a lookup table to obtain image data for LD drive. The reproduction characteristics (γ characteristic) of the electrophotographic method is halftone enhance type, i.e., nonlinear. This indicates that the relationship between the image data and the attached amount of toner is nonlinear. However, the relationship between the image data of the density scale and the attached amount of toner is preferably linear. Therefore, a nonlinear conversion of the image data is carried out to ensure this relationship.

In multi-line screen process unit 142, the so-called multi-line screen pattern is superimposed on the image data in the main scanning direction at a certain cycle in order to achieve half tone reproduction of uniformity. The reproduction characteristics in the electrophotographic system is degraded in the granularity (asperity) of the image since the predetermined property will not be exhibited or the level of the underlying portion will become unsteady if the scanning rate is increased. Thus, the tonal gradation reproduction cycle of the image is set double, i.e., the unit of 2 pixels is set, and the pixel data of the right side are all stacked to the pixel data of the left side to suppress variation in the tone reproduction characteristic on a pixel-to-pixel basis.

In the area where high resolution is required such as the contour of a character in an image, the contour of the character will be disconnected by the multi-line screen pattern to degrade the reproduction of the text. When the tone reproduction cycle is double, i.e., when the resolution becomes ½, there is a problem that moiré is increased when a halftone original is copied. However, in the digital copy machine of the present invention, the contour portion of a character is determined at the image reader 110 side, and signal $\overline{\text{LIMOS}}$ is sent to image reader 120 together with the pixel data forming the image data. On the part of image recorder 120, the superimposition of the multi-line screen pattern and the alteration of the reproduction cycle is switched in real time according to signal $\overline{\text{LIMOS}}$. By switching the specification of whether to carry out a halftone reproduction process or not, text reproduction and halftone granularity are provided.

Figure 16A:
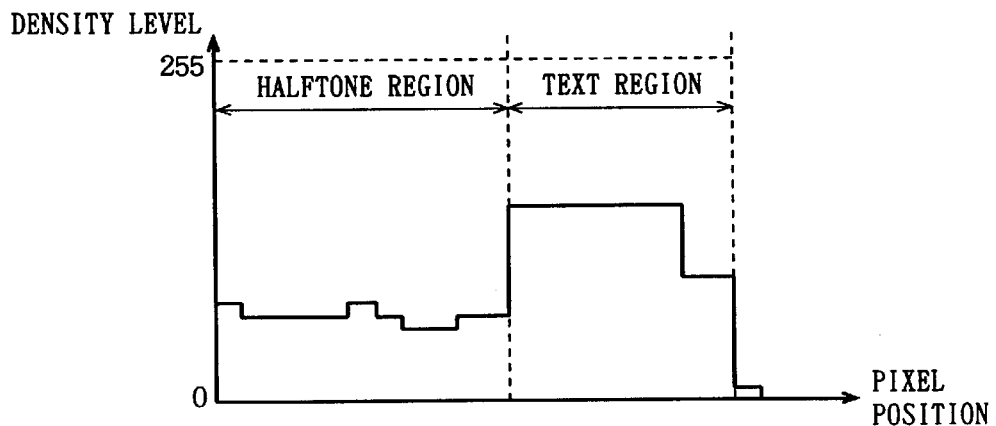
FIGS. 16A–16C show the results of the switching of a multi-line screen process in a multi-line screen processing unit.
Figure 16B:
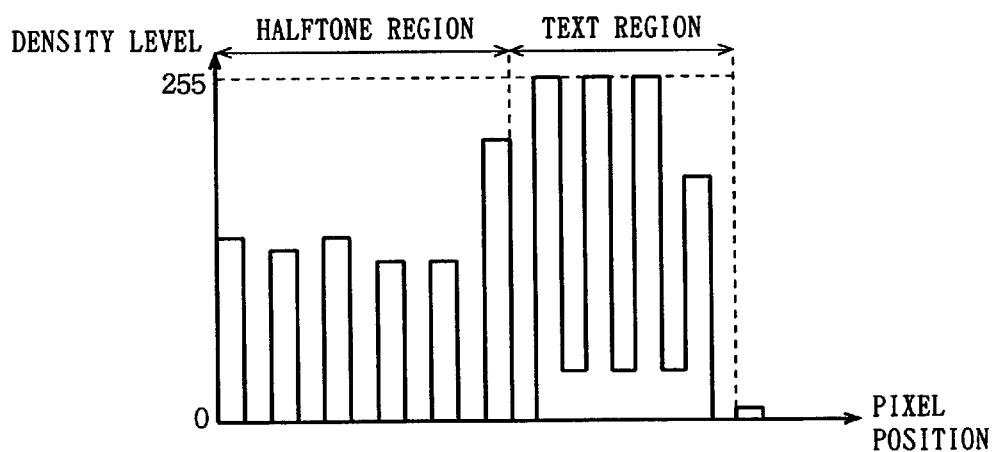
Figure 16C:
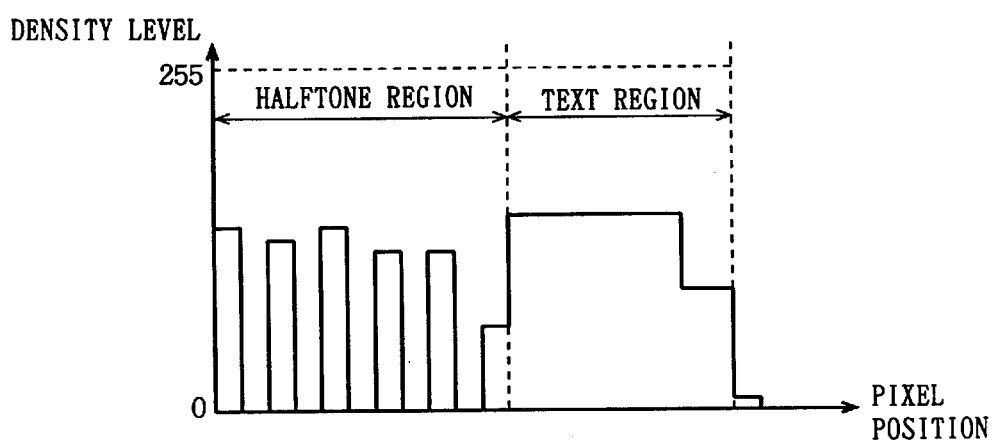

The process of multi-line screen process unit 142 will be described with reference to FIGS. 16A–16C representing the result of the switching process of the multi-line screen process. FIG. 16A shows an example of image data subjected to a γ conversion process. FIG. 16B shows an example of image data where a multi-line screen process is carried out on the image data entirely. FIG. 16C shows an example of image data where a multi-line screen process is carried out only on a particular region (the halftone region of a picture.continuous tone image) of the image data of FIG. 16A.

Referring to FIG. 16B, the multi-line screen process allows favorable effect in the halftone region of the image. However, the character contour region is degraded in reproduction as the contour of the character is disconnected. In the present invention, a multi-line screen process is carried out on image data corresponding to a halftone region and a multi-line screen process is not carried out on the image data in the character-line copy region depending upon signal $\overline{\text{LIMOS}}$ from image process unit 115. FIG. 16C shows the result where such a multi-line screen process is carried out. By such implementation of multi-line screen process unit 142, the optimum tone reproduction characteristics can be obtained for both the character.line copy region and the halftone region.

More specifically, output data (DY7-0) from selector 143 is selected as set forth in the following according to whether signal $\overline{\text{LIMOS}}$ attains a low level (L) or a high level (H).

When $\overline{\text{LIMOS}}$=L, DY7-0=DA7-0
When $\overline{\text{LIMOS}}$=H, DY7-0=DS7-0

The tone reproduction cycle is 400 dpi and 200 dpi in the main scanning direction when signal $\overline{\text{LIMOS}}$ attains an L level and an H level, respectively. Also, 25% of two pixels of the main scan is forcefully substituted with white data when signal $\overline{\text{LIMOS}}$ attains a n H level.

Pixel data (DY7-0) output from selector 143 is applied to a D/A conversion process unit 144 to be converted into an analog electric signal. This analog electric signal is current-amplified by a current control process unit 145 to be provided to a laser luminance source 122 (refer to FIG. 1).

By doubling the tone reproduction cycle of an image, i.e., by processing pixels in the unit of 2 pixels, and stacking all the image data at the right side on the image data of the left side, a space is formed between the dots in the halftone area in FIGS. 16B and 16C subjected to a multi-line screen process in comparison to FIG. 16A. Therefore, the granularity of the highlight area to which the visual aspect of a human being is high can be improved.

In D/A conversion process unit 144, digital data of 8 bits (256 gray scale levels) per pixel is converted into an analog electric signal by a D/A converter. In current control process unit 145, the amount of current conducted to laser luminance source 122 is controlled according to the analog electric signal sent from D/A conversion process unit 144 to alter the intensity of the LD of laser luminance source 122 for driving.

Figure 3:
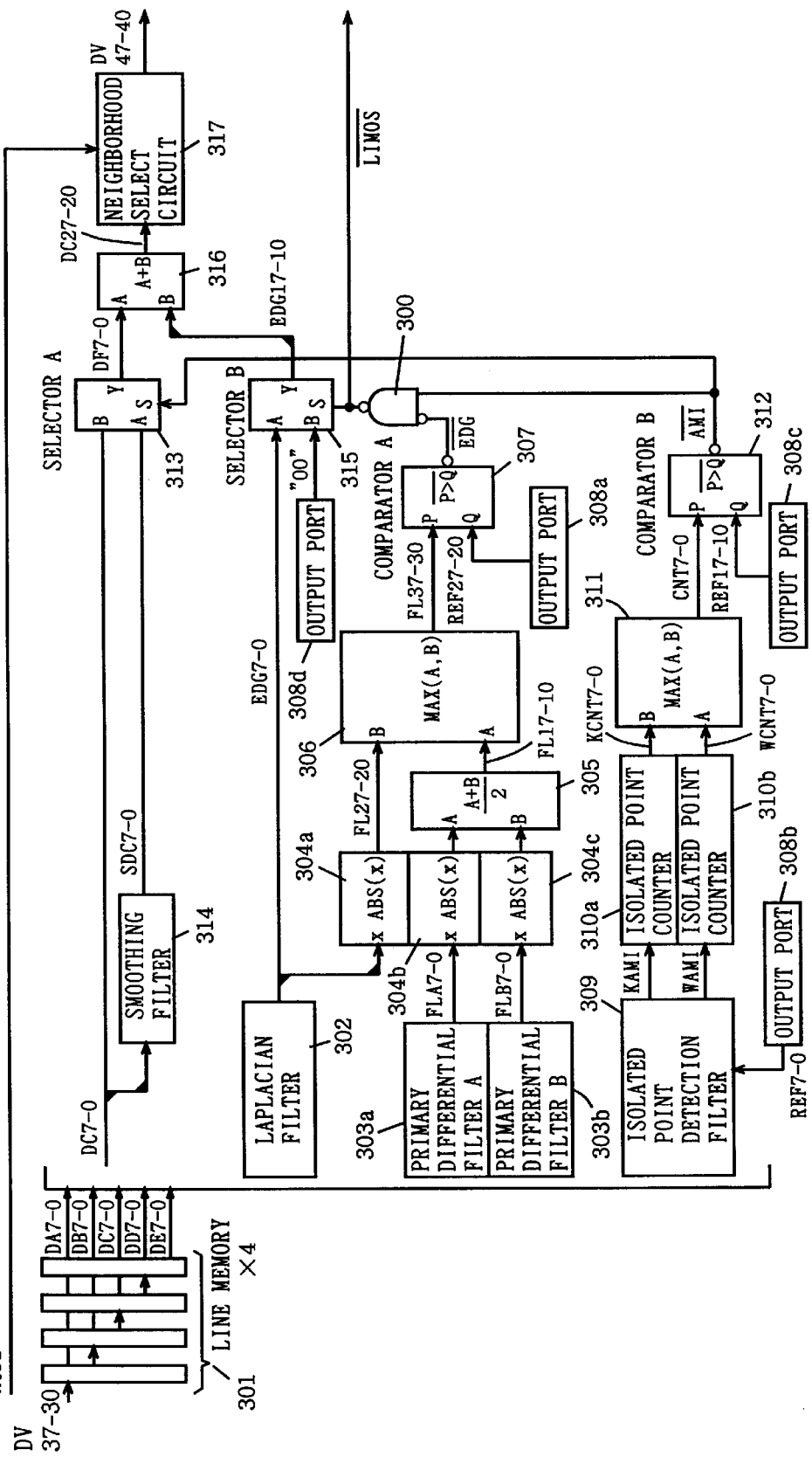
FIG. 3 is a block diagram of a region determination/MTF correction unit according to a first embodiment of the present invention.

In the above-described embodiment, the contour enhancement unit that applies a contour enhancement process on input image data constituted by successively input pixel data is implemented by components in the circuitry forming the image processing unit 115 of FIG. 3 excluding neighborhood select circuit 317. The image processing apparatus is formed including a contour enhancement unit by image processing unit 115.

Line buffers 601a, 601b, 601c, mask process unit 602 and maximum value detection circuit 603 form the first maximum value output unit for replacing the target pixel data in the data output from the contour enhancement unit with the maximum density data (DI7-0) in the data of the target pixel and surrounding pixels for output.

Line buffers 604a, 604b, 604c, mask process unit 605 and minimum value detection circuit 606 form the first minimum value output unit for substituting the target pixel data in data (DI7-0) output from the first maximum value output unit with the minimum density data (CL7-0) in the data of the target pixel and the surrounding pixels for output.

Line buffers 701a, 701b, 701c, mask process unit 702 and minimum value detection circuit 703 form the second minimum value output unit for replacing the target pixel data in the data output from the contour enhancement unit with the minimum density data (ER7-0) in the data of the target pixel and the surrounding pixels for output.

Line buffers 704a, 704b, 704c, mask process unit 705 and maximum value detection circuit 706 form the second maximum value output unit for replacing the target pixel data in data (ER7-0) output from the second minimum value output unit with the maximum density data (OP7-0) in the data of the target pixel and the surrounding pixels for output.

Selector 504 providing data (DV47-40) output from neighborhood select circuit 317 receiving the output data of neighborhood maximum value-minimum value circuit 502 and neighborhood minimum value-maximum value circuit 503 form the neighborhood select unit that outputs either the minimum density data (CL7-0) or the maximum density data (OP7-0) according to a predetermined condition.

In the present embodiment, the predetermined condition is whether the density value in the target pixel data in the data output from the contour enhancement unit is at least the data (MREF27-20) from output port 308e.

(2) Second Embodiment

The second embodiment of the present invention has a structure similar to that of the first embodiment, provided that neighborhood select circuit 317 (FIG. 3) is modified as set forth in the following. In the following, only the structure of the neighborhood select circuit will be described. Description of the remaining components will not be repeated.

Figure 17:
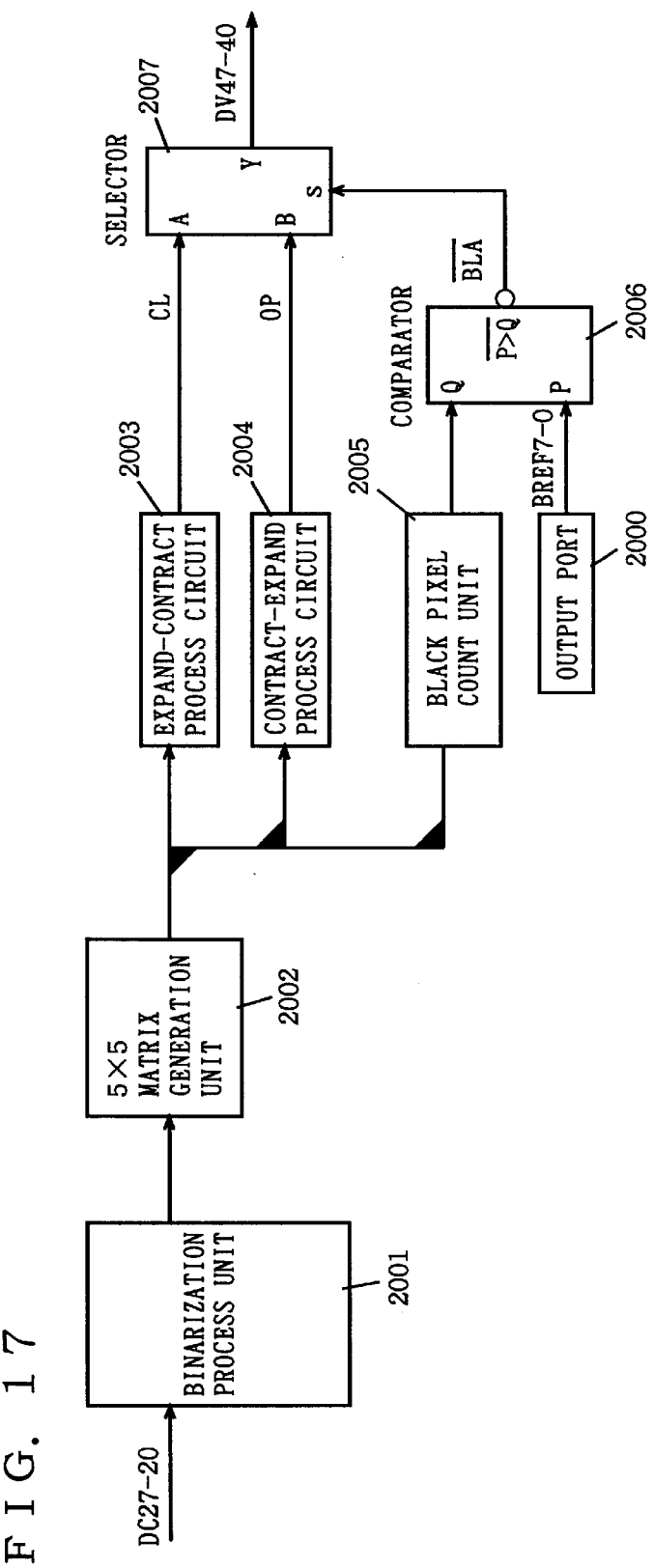
FIG. 17 is a block diagram of a neighborhood select circuit according to a second embodiment of the present invention.

Referring to FIG. 17 showing the neighborhood select circuit of the second embodiment, pixel data (DC27-20) output from region determination/MTF correction unit 135 of FIG. 3 is converted into binary data by a binarization process unit 2001. More specifically, data representing a black pixel is converted into 1. Data representing a white pixel is converted into "0". The converted data is applied to a 5×5 matrix generation unit 2002.

In 5×5 matrix data generation unit 2002, an image matrix of 5×5 pixels is generated on the basis of the pixel data from binarization process unit 2001. The generated matrix data is applied to an expand-contract process circuit 2003, a contract-expand process circuit 2004, and a black pixel count unit 2005.

In black pixel count unit 2005, the number of black pixels ("1") in the image matrix of 5×5 pixels is counted. The result is provided to comparator 2006. Comparator 2006 compares the input number of black pixels with the threshold value (BREF7-0) output from output port 2000 to provide a signal $\overline{BLA}$ of an H level and an L level when the number of black pixels is at least the threshold value (BREF7-0) and less than the threshold value (BREF7-0), respectively.

Figure 18A:
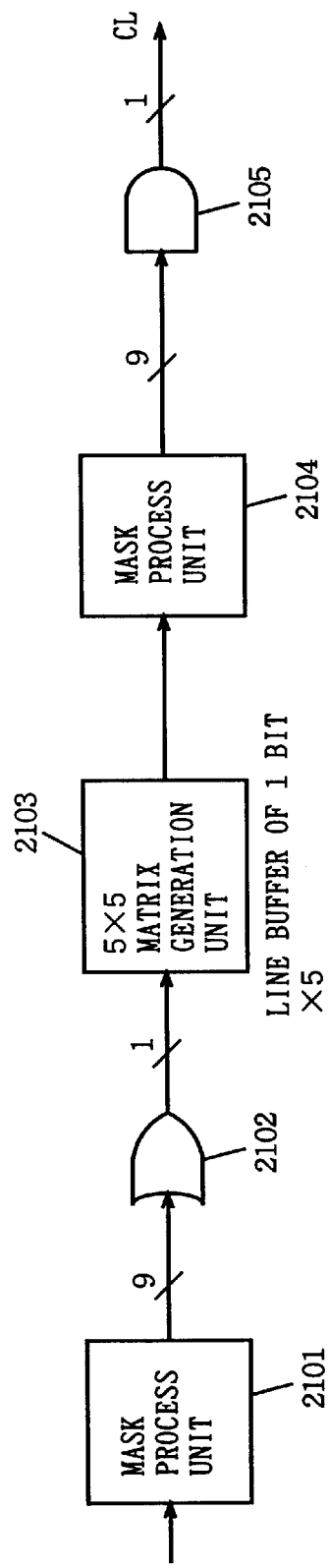
FIGS. 18A and 18B are block diagrams of an expand-contract process circuit and a contract-expand process circuit.

The process of expand-contract process circuit 2003 will be described with reference to the block diagram of FIG. 18A. The data input from 5×5 matrix generation unit 2002 is applied to mask process unit 2101.

FIGS. 19A–19F are diagrams for describing the mask process of a mask process unit 2101.

In mask process unit 2101, each corresponding data in the 5×5 matrix is multiplied with respect to image data g(i, j) (where i, j=1, 2, 3, 4, 5) from 5×5 matrix data generation unit 2002 (refer to FIG. 19A or 19D) using 5×5 mask data a(i, j) (where i, j=1, 2, 3, 4, 5) having each data preset to 0 or 1 as shown in FIG. 19B or 19E. The result of the integration of each data g(i, j)·(i, j) is output as the result of the 5×5 mask process (refer to FIG. 19F).

Figure 20:
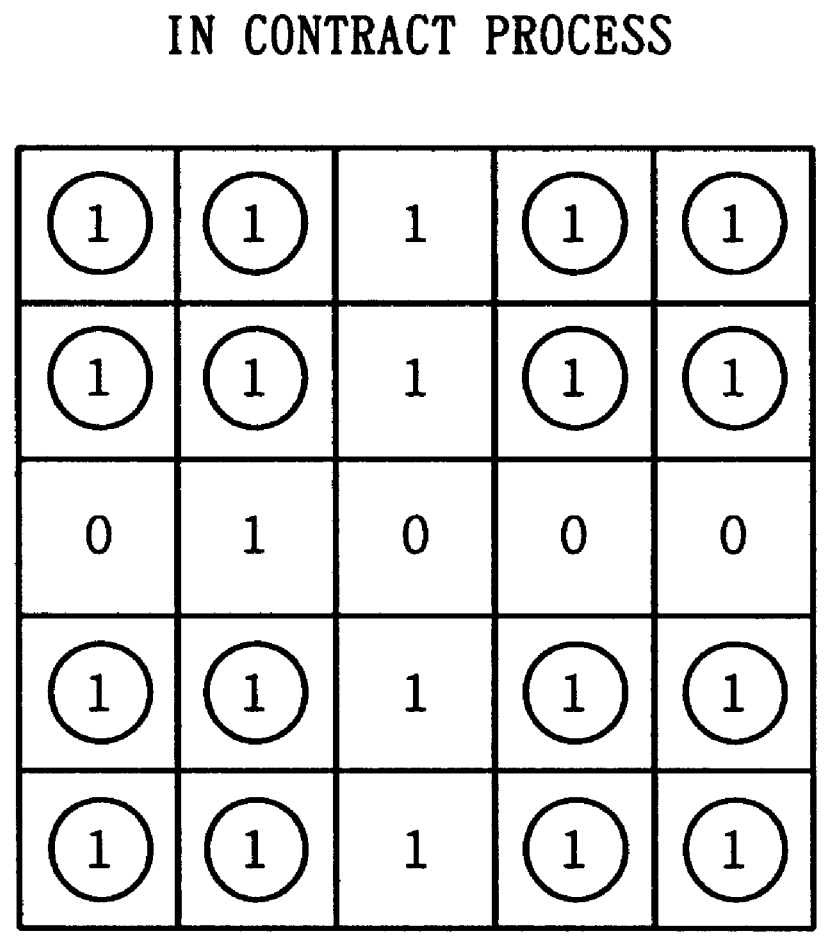

In a contract process, the data of a pixel position set as "0" in mask data a(i, j) is replaced with "1" and output with respect to the result of each data of g(i, j)·a(i, j). (Refer to FIG. 20: the data of a pixel position circled by ○ is set to "1" since mask data a(i, j) is "0".)

The data output from mask process unit 2101 is applied to a 9-input 1-output OR circuit 2102. OR circuit 2102 outputs "1" when at least one of the nine data of the 5×5 pixels subjected to a mask process is "1". This is referred to as an expand process.

Data output from OR circuit 2102 is applied to a 5×5 matrix generation unit 2103 including five line buffers of 1 bit that are connected successively. In 5×5 matrix generation unit 2103, a matrix of 5×5 pixels is extracted from the image signals of 5 lines. The extracted matrix is provided to a mask process unit 2104.

In mask process unit 2104, a process similar to that carried out by mask process unit 2101 is effected. The processed result is provided to a 9-input 1-output AND circuit 2105.

AND circuit 2105 outputs "1" when all the 9 data of the 5×5 pixels subjected to a mask process are "1". This is referred to as a contract process.

Data (CL) output from AND circuit 2105 is provided to a terminal A of a selector 2007 as the output data from expand-contract process circuit 2003.

Figure 18B:
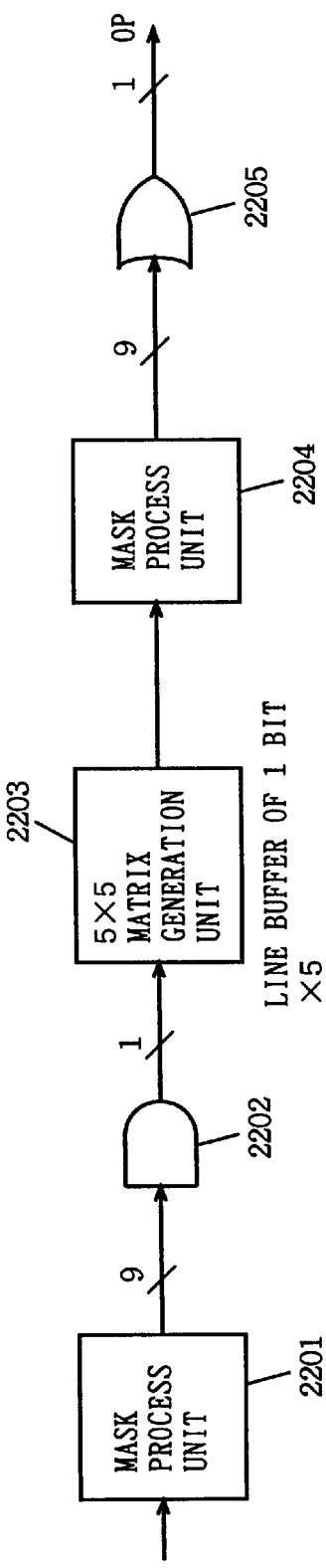

The process of contract-expand process circuit 2004 of FIG. 17 will be described with hereinafter reference to the block diagram of contract-expand process circuit 2004 of FIG. 18B.

In contract-expand process circuit 2004, the data from 5×5 matrix generation unit 2002 is applied to mask process unit 2201 to be subjected to a process similar to that carried out by mask process unit 2101. The processed result is applied to a 9-input 1-output AND circuit 2202. AND circuit 2202 carries out the aforementioned contract process. The processed result is applied to a 5×5 matrix generation unit 2203 including five line buffers of 1 bit.

In 5×5 matrix generation unit 2203, an image matrix of 5×5 pixels is extracted from the obtained image signals of 5 lines. The extracted image matrix is provided to a mask process unit 2204. In mask process unit 2204, a mask process similar to that of mask process unit 2101 is carried out. The processed result is provided to a 9-input 1-output OR circuit 2205.

OR circuit 2205 carries out the above-described expand process. The processed result data (OP) is provided to a terminal B of a selector 2007 as the output data of contract-expand process circuit 2004.

Selector 2007 provides output pixel data (DV) according to signal $\overline{BLA}$ from comparator 2006. Data (CL) from expand-contract process circuit 2003 is output when signal $\overline{BLA}$ attains an H level, and data (OP) from contract-expand process circuit 2004 is output when signal $\overline{BLA}$ attains an L level.

In addition to the advantage similar to that of the neighborhood select circuit in the first embodiment, the neighborhood select circuit of the present embodiment has the advantage of reducing the memory capacity of the line buffer since binarization is initially carried out by a binarization process in comparison to the neighborhood process circuit of the first embodiment.

Figures 21A, 21B:
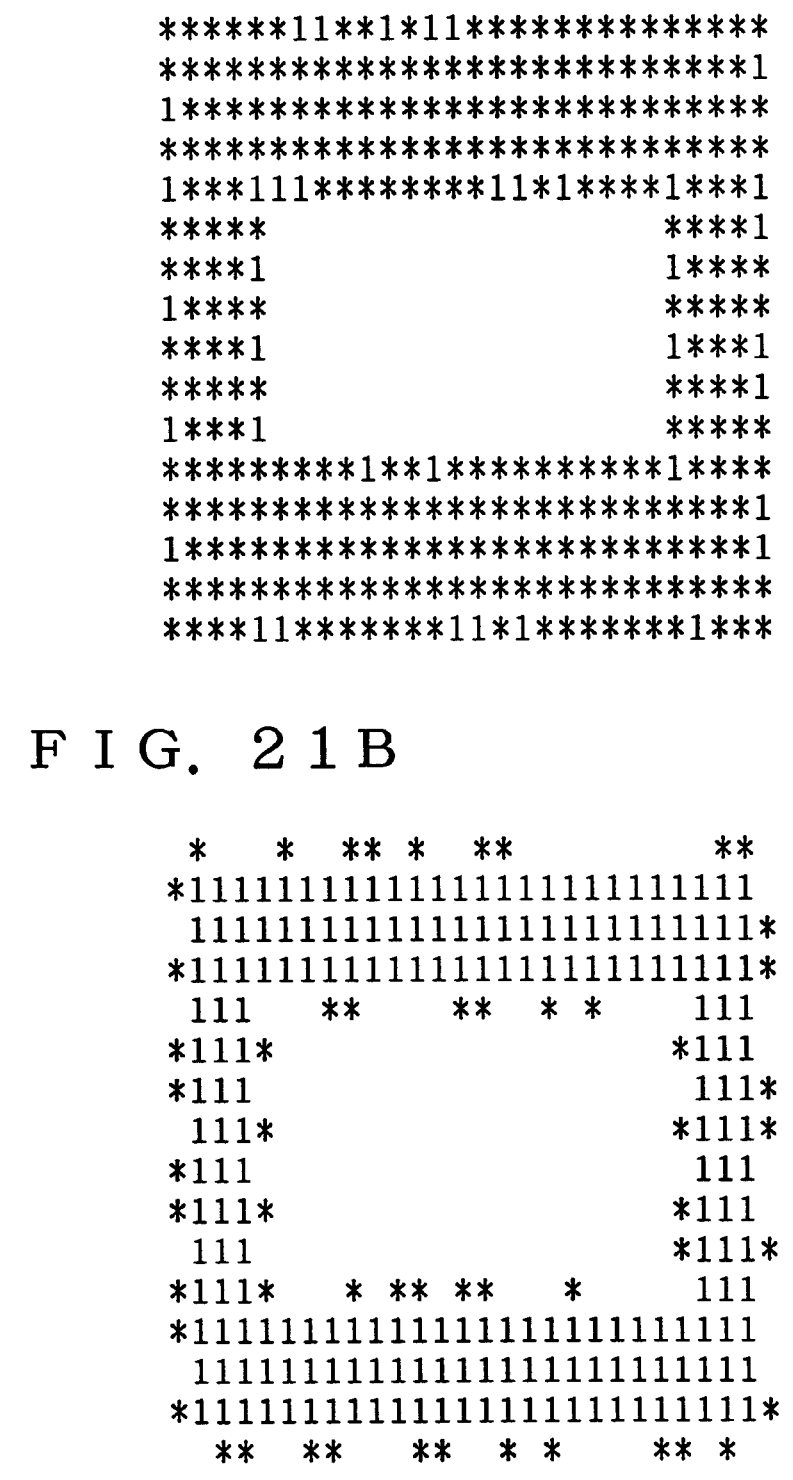

FIGS. 21A and 21B are diagrams for describing the advantage of image processing using binary data in the present embodiment.

FIG. 21A shows the results of binarized pixel data subjected to an expand-contract process. In FIG. 21A, "*" indicates that the pixel position corresponds to the position where a black pixel is present before the process "1" indicates the position of a black pixel obtained by applying the process. By the expand-contract process, disconnection in line strokes in a text image can be corrected and a hole filling process is allowed. The unevenness can be corrected.

FIG. 21B shows the results of binarized pixel data subjected to a contract-expand process. The meaning of the signs of "*" and "1" in FIG. 21B are identical to those of FIG. 21A. Thus, unevenness caused by noise removal on the line stroke in a text image can be corrected. Also, an isolated point due to noise in the image can be removed. Furthermore, highlight granularity noise and texture noise of the error diffusion can be removed.

In the second embodiment of the present invention, binarization process unit 2001 forms the binarization unit of converting output data from the contour enhancement unit into binary data.

5×5 matrix generation unit 2002, mask process unit 2101, and OR circuit 2102 form the first maximum value output unit for replacing the target pixel data in the data output from the contour enhancement unit with the maximum density data in the data of the target pixel and surrounding pixels for output.

5×5 matrix generation unit 2103, mask process unit 2104 and AND circuit 2105 form the first minimum value output unit for replacing the target pixel data in data output from the first maximum value output unit with the minimum density data (CL) in the data of the target pixel and the surrounding pixels for output.

5×5 matrix generation unit 2002, mask process unit 2201 and AND circuit 2202 form the second minimum value output unit for substituting the target pixel data in the data output from the contour enhancement unit with the minimum density data in the data of the target pixel and the surrounding pixels for output.

5×5 matrix generation unit 2203, mask process unit 2204, and OR circuit 2205 form the second maximum value output unit for substituting the target pixel data in the data output from the second minimum value output unit with the maximum density data (OP) in the data of the target pixel and the surrounding pixels for output.

In the second embodiment of the present invention, binary data is applied and processed in the first maximum value output unit, the first minimum value output unit, the second minimum value output unit and the second maximum value output unit.

Selector 2007 providing output data (DV47-40) from neighborhood select circuit 317 receiving output data (CL, OP) from expand-contract process circuit 2003 and contract-expand process circuit 2004 forms the neighborhood select unit that provides either the minimum density data (CL) or the maximum density data (OP) according to a predetermined condition.

In the present embodiment, the predetermined condition is whether the number of black pixel data in the target pixel data and surrounding pixel data calculated by black pixel count unit 2005 is at least the data (BREF7-0) output from output port 2000 or not.

(3) Third Embodiment

In contrast to the neighborhood select circuit of the first and second embodiments in which the eventual output data is based on the comparison result between the threshold value output from output port 308a or 2000 and the data according to the input pixel data, the neighborhood select circuit of the present embodiment is not limited as such. The data output from the neighborhood select circuit of the present embodiment can be provided on the basis of the comparison result between data according to information input by an operator and data according to input pixel data.

The image processing apparatus of the third embodiment has data output according to the comparison result between data according to information entered by an operator and data according to input pixel data. The image processing apparatus of the third embodiment is similar to the image processing apparatus (refer to FIG. 3) of the first embodiment, provided that neighborhood select circuit 317 is modified. Components other than the neighborhood select circuit are similar to those of the first embodiment of the present invention, and their description will not be repeated.

Figure 22:
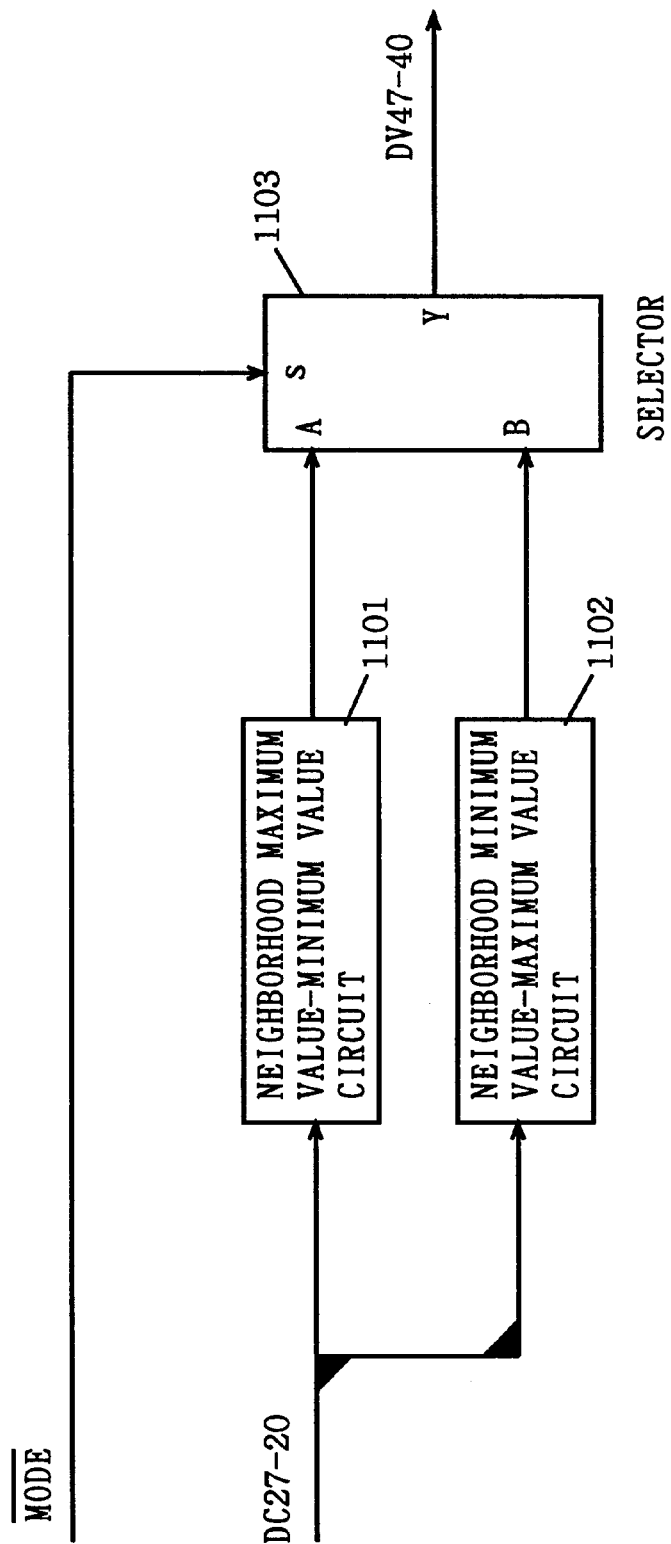
FIG. 22 is a block diagram of a neighborhood select circuit according to a third embodiment of the present invention.

Referring to the block diagram of FIG. 22 showing a neighborhood select circuit of the third embodiment, pixel data (DC27-20) output from adder 316 of the region determination/MTF correction unit of FIG. 3 is applied respectively to a neighborhood maximum value-minimum value circuit 1101 and a neighborhood minimum value-maximum value circuit 1102.

In neighborhood maximum value-minimum value circuit 1101, a process similar to that of a neighborhood maximum value-minimum value circuit 502 (refer to FIG. 8) is carried out on the input data. The processed result is provided to a terminal A of selector 1103.

In neighborhood minimum value-maximum value circuit 1102, a process similar to that by neighborhood minimum value-maximum value circuit 503 (refer to FIG. 8) is carried out on the input data. The processed result is provided to a terminal B of selector 1103.

A signal ($\overline{\text{MODE}}$) including information of the finishing effect of the text image when copied, i.e. whether reproduction in a thick aspect is desired or thin aspect is desired, is applied to terminal s of selector 1103. The information is entered by an operator through operation panel 137 (refer to FIG. 2).

Figure 23:
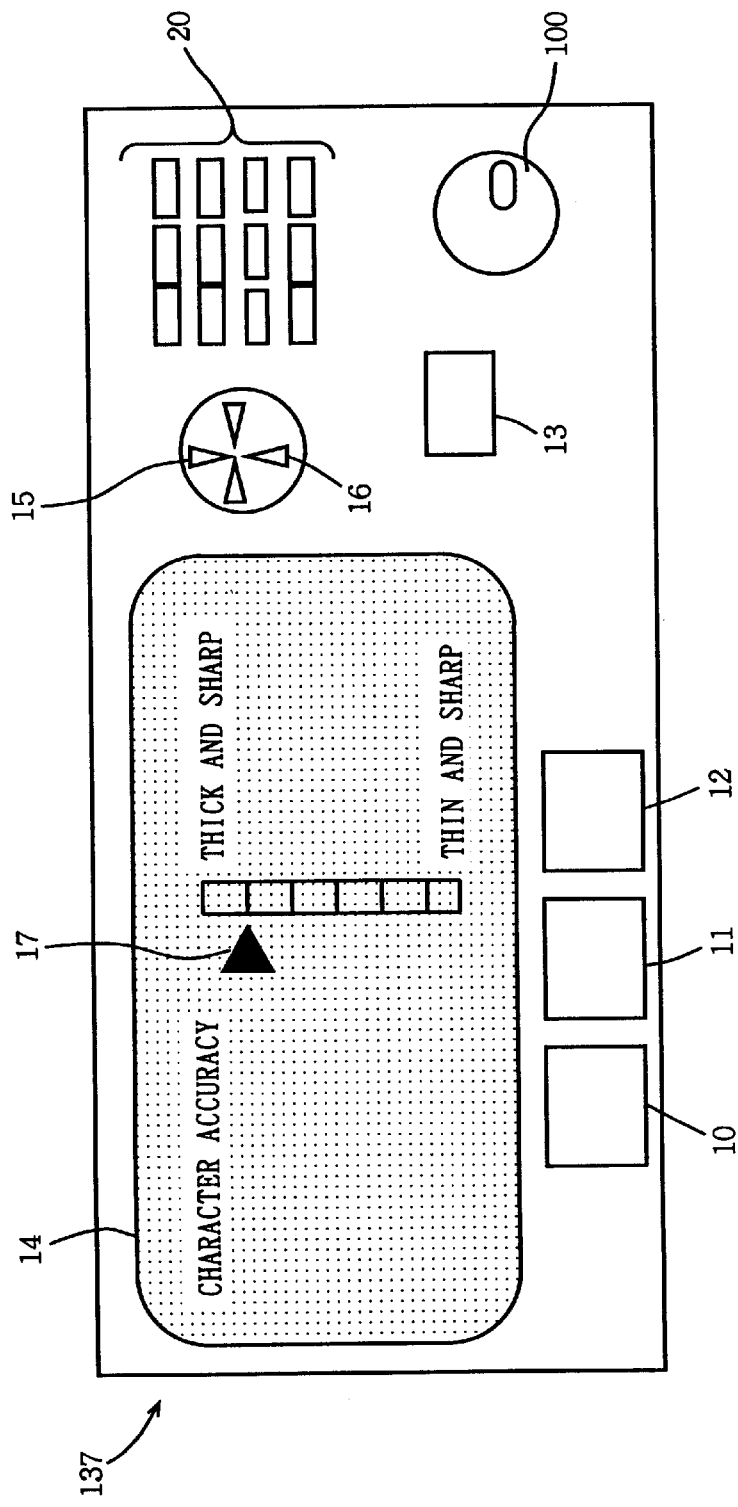
FIG. 23 shows an example of an operation panel of FIG. 2.

An example of the operation panel through which the above-described information can be entered by an operator is shown in FIG. 23.

Referring to FIG. 23, operation panel 137 includes a start key 100 for initiating a copy operation by the copy machine, a stop key 11 for sup pressing a copy operation, a ten-key 20 for entering numeric values such as the number of copies to take, a clear key 12 for clearing the input information such as the number of copies to take, and a display unit 14 for providing a display of the information input by the operator or the operation status of the copy machine.

The copy machine of the present embodiment includes a number input mode for entering the number of copies to take and a text accuracy input mode for entering the desired level of the thickness of the text when copied. 13 designates a mode switching key for switching between these two input modes. 15 designates an up-key for moving the cursor displayed on display unit 14 upwards. 16 designates a down-key for moving the cursor downwards.

In the copy machine of the present embodiment, the text accuracy input mode is set by depressing mode switch key 13 when a desired level of the thickness of the text is to be entered. When the copy machine is set to the text accuracy input mode, a screen as shown in FIG. 24 is provided on display unit 14. The operator appropriately depresses up-key 15 or down-key 16 to shift cursor 17 on the screen to an appropriate position indicating the desired thickness of the character (7 steps from "thick and sharp" to "thin and sharp"). The threshold value corresponding to the position of the cursor is output from output port 308 shown in FIG.3.

Signal $\overline{\text{MODE}}$ applied to input s of selector 1103 of FIG. 22 is a signal that corresponds to the desired thickness level of the reproduced character set by an operator. The value is altered according to the thickness level set by the operator.

Selector 1103 responds to signal $\overline{\text{MODE}}$ to output either the data from neighborhood maximum value-minimum value circuit 1101 or neighborhood minimum value-maximum value circuit 1102, which is provided as output data (DV47-40). The neighborhood select circuit of the present embodiment selects the data to be output according to the desired thickness level to be reproduced that is set by an operator.

In the present embodiment, a neighborhood select circuit is disclosed in which neighborhood maximum value-minimum value circuit 1101 and neighborhood minimum value-maximum value circuit 1102 are both provided in parallel for selectively providing output data from selector 1103. However, the neighborhood select circuit may include only one of the two circuits. In this case, data output from that circuit and the input data (DC27-20 in the case of FIG. 22) are applied to selector 103, which is selectively output therefrom.

The effect of a neighborhood maximum value-minimum value process of the present invention on a text image will be described hereinafter.

FIG. 24A shows in a two dimensional manner the density distribution corresponding to the pixel position of data prior to the process of neighborhood maximum value-minimum value process that is applied to the neighborhood maximum value-minimum value circuit. Referring to FIG. 24A, the text image has the line strokes disconnected and blurred depending upon the readout accuracy of the image reader and the effect of the density linear data of the CCD data corrected by LOG correction unit 133 (refer to FIG. 2). There will be an area where the density is locally reduced in the high density area.

FIG. 24B shows in a two dimensional manner the density distribution with respect to the pixel position of image data subjected to the neighborhood maximum value-minimum value process. When the neighborhood maximum value-minimum value process is applied, reduction in density of the high density portion induced by disconnection in line strokes and blur due to the above-described cause is corrected by the high density data of the surrounding pixel.

The effect of the neighborhood maximum value-minimum value circuit of the present invention on a text image will be described hereinafter.

Figure 25B:
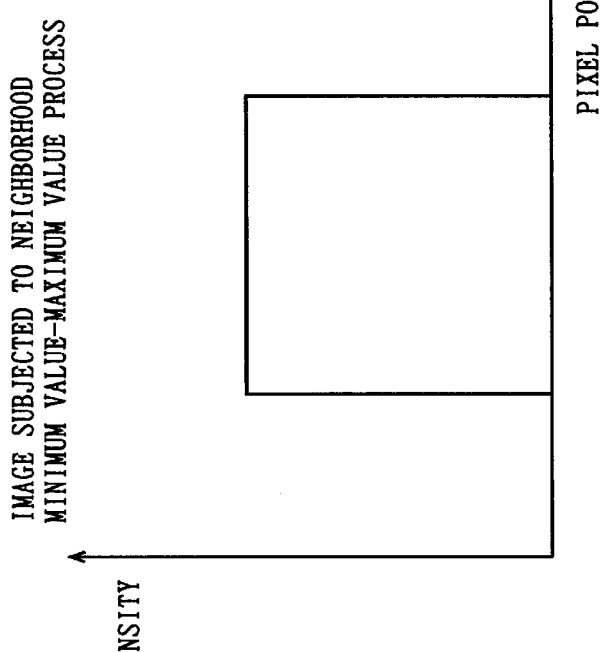
FIGS. 25A and 25B show the effect of a process by a neighborhood minimum value-maximum value circuit.
Figure 25A:
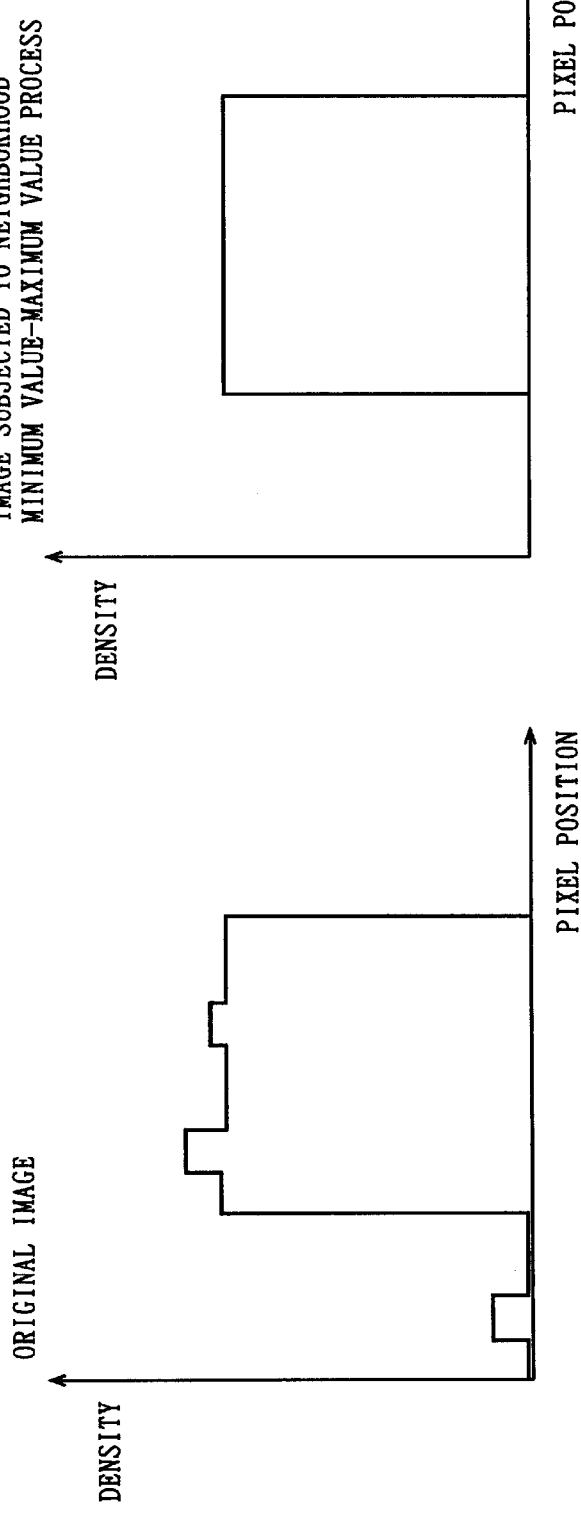

FIG. 25A is a diagram showing in a two dimensional manner the density distribution with respect to the pixel position of data prior to the neighborhood minimum value-maximum value process. In FIG. 25A, an image of low density is shown as an isolated point in areas other than the text region due to various causes such as splatter of toner and contamination in the original. Also, the noise on a line is exhibited unevenly in the line strokes of a character.

By applying the neighborhood minimum value-maximum value process, the pixel data having noticeable density in the image data is replaced with data of low density of the surrounding pixel. Therefore, an isolated point caused by various factors can be removed and unevenness in line strokes can be corrected.

(4) Fourth Embodiment

In the previous neighborhood select circuit of the third embodiment, either the data from neighborhood maximum value-minimum value circuit 1101 or neighborhood minimum value-maximum circuit 1102 is selectively output according to the comparison result between data according to information entered by an operator and the data according to input pixel data. A neighborhood select circuit in which the required memory capacity is reduced can be implemented by having the circuit that carries out a process corresponding to those of neighborhood maximum value-minimum value circuit 1101 and neighborhood minimum value-maximum value circuit 1102 receives and processes binary data. The image processing apparatus of the fourth embodiment of the present invention includes such a neighborhood select circuit. The image processing apparatus of the fourth embodiment has neighborhood select circuit 317 (refer to FIG. 3) of the image processing apparatus of the first embodiment modified as set forth in the following. The structure of the fourth embodiment other than the neighborhood select circuit is similar to the structure of the first embodiment. Therefore, description thereof will not be repeated.

Figure 26:
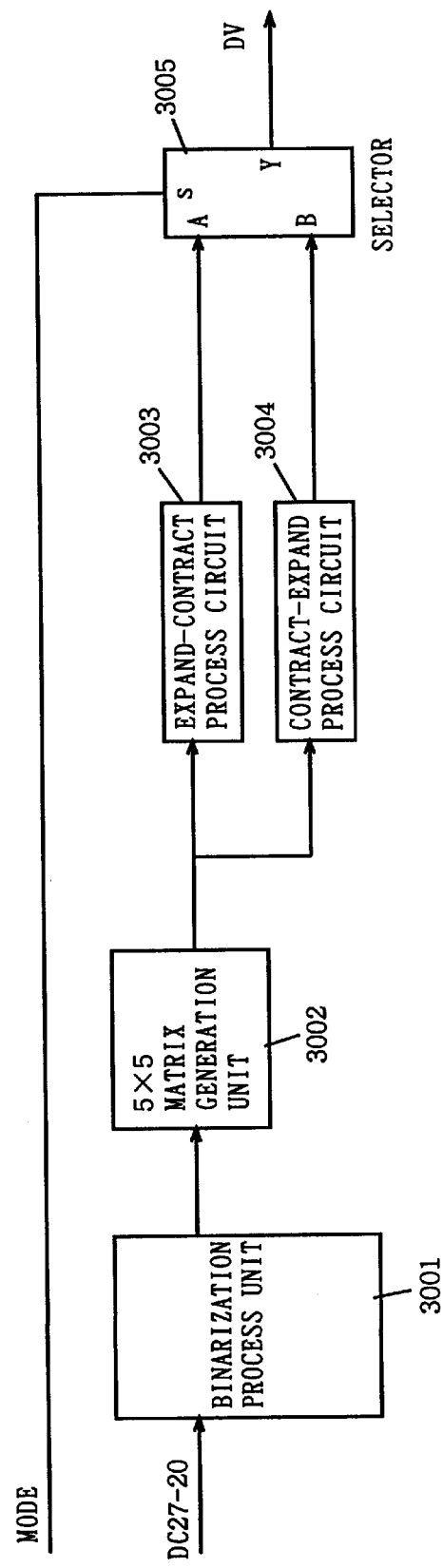
FIG. 26 is a block diagram of a neighborhood select circuit according to a fourth embodiment of the present invention.

First, the structure of the neighborhood select circuit of the fourth embodiment will be described with reference to the block diagram of FIG. 26.

Pixel data (DC27-20) output from region determination/MTF correction unit of FIG. 3 is applied to a binarization process unit 3001. Binarization process unit 3001 converts the input data (DC27-20) into binary data. More specifically, data representing a black pixel is converted into "1" and data representing a white pixel is converted into "0". The converted data is applied to a 5×5 matrix generation unit 3002.

In 5×5 matrix generation unit 3002, an image matrix of 5×5 pixels is generated on the basis of the input pixel data in a manner similar to that of 5×5 matrix data generation unit 2002. The generated matrix data is applied respectively to an expand-contract process circuit 3003 and a contract-expand process circuit 3004.

In expand-contract process circuit 3003, a process similar to that carried out by expand-contract process circuit 2003 (refer to FIG. 17) is carried out. In contract-expand process circuit 3004, a process similar to that carried out by contract-expand process circuit 2004 (refer to FIG. 17) is carried out.

The processed result of expand-contract process circuit 3003 is applied to input A of a selector 3005. The processed result of contract-expand process circuit 3004 is applied to input B of selector 3005.

Signal $\overline{\text{MODE}}$ according to the information entered by the operator is applied to input s of selector 3005. Similar to selector 1103 (refer to FIG. 22), selector 3005 selects and provides the data from either expand-contract process circuit 3003 or contract-expand process circuit 3004.

According to the fourth embodiment of the present invention, the memory capacity required for the neighborhood select circuit can be reduced in addition to the advantage that the data output from the neighborhood select circuit is provided on the basis of the comparison result between the data according to information entered by an operator and data according to input pixel data.

Although the neighborhood select circuit of the present embodiment includes both an expand-contract process circuit 3003 and a contract-expand process circuit 3004 for selectively providing either output data from selector 3005, the neighborhood select circuit may include only one of the two circuits. In this case, the output data of that circuit and the input data (DC27-20 in the case of FIG. 22) are applied to selector 3005, and either data is selectively output therefrom.

(5) Fifth Embodiment

An image processing apparatus of a fifth embodiment of the present invention has a structure similar to that of the previous embodiments, provided that region determination/MTF correction unit 135 differs. Therefore, the remaining components will not be repeatedly described.

Figure 27:
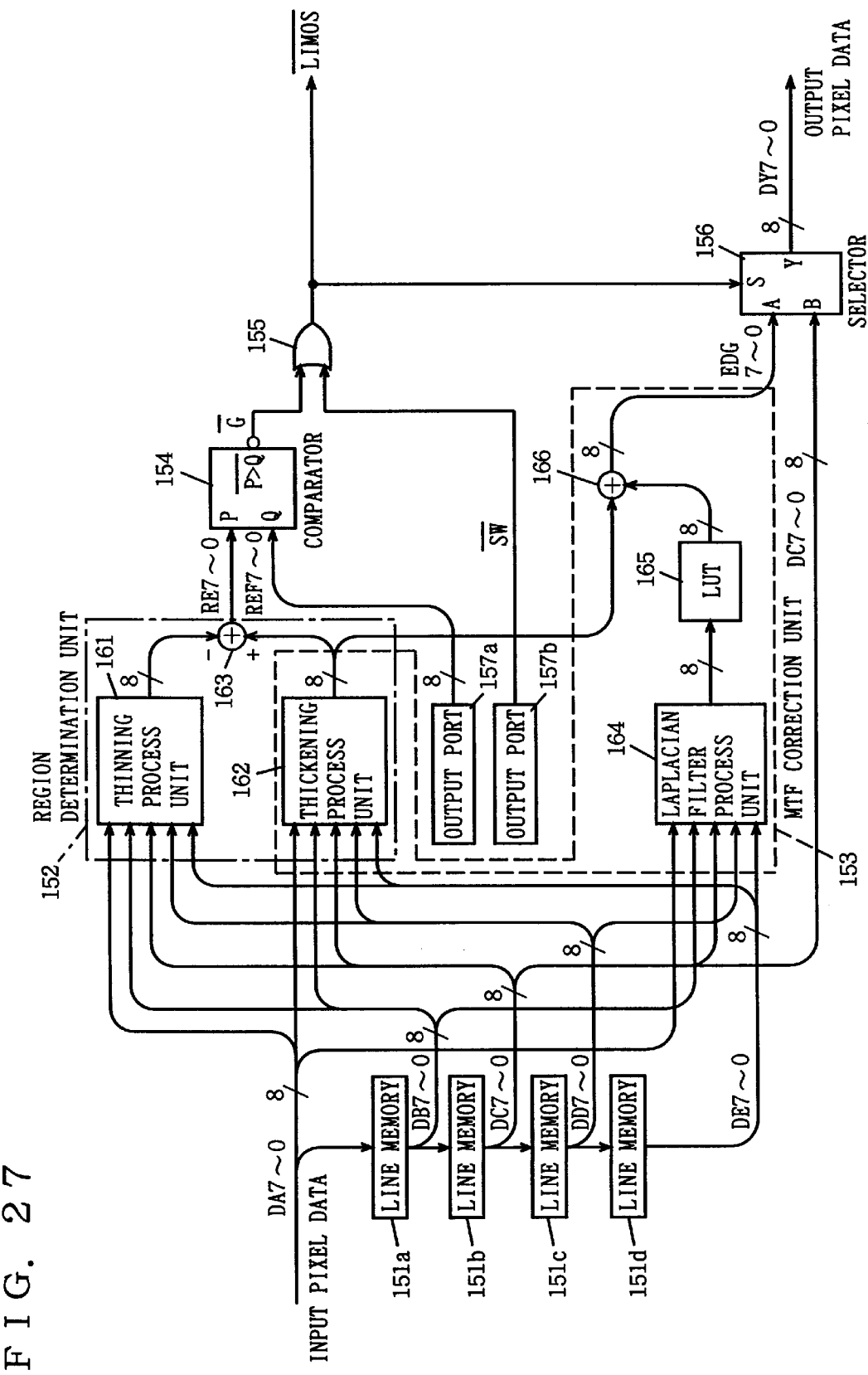
FIG. 27 is a block diagram of a region determination/MTF correction unit according to a fifth embodiment of the present invention.

Referring to FIG. 27, a region determination unit 152 and a MTF correction unit 135 of the fifth embodiment has four line memories 151a, 151b, 151c and 151d connected in series with respect to the lines of the input pixel data (DA7-0) that are entered successively from variable scale-shift process unit 134. Input pixel data (DA7-0) and pixel data of 4 lines (DB7-0, DC7-0, DD7-0, and DE7-0) delayed by each one line are respectively applied to region determination unit 152 and MTF correction unit 153. Pixel data (DC7-0) including the target pixel data is applied to terminal B of a selector 156.

In region determination unit 152, contour detection of the input pixel data is carried out. The detected result is applied to input P of a comparator 154 as multi-value data (RE7-0). This multi-value data is compared with multidata (REF7-0) applied to input Q from output port 157a that is set by the CPU. A state signal $\overline{G}$ of the comparison result is generated according to the following definition.

When RE7-0>REF7-0, $\overline{G}$=L (This pixel is defined as residing in a text.line copy region.)

When RE7-0≦REF7-0, $\overline{G}$=H (This pixel is defined as residing in a picture.halftone region.)

State signal $\overline{G}$ is applied to an OR gate 155 together with signal $\overline{SW}$ of 1 bit from output port 157b that is set by a CPU and the like. In response, signal $\overline{LIMOS}$ which is the region determination signal is generated. Signal $\overline{LIMOS}$ of the following level is provided depending upon signal $\overline{SW}$.

When $\overline{SW}$=L, $\overline{LIMOS}$=L

When $\overline{SW}$=H, $\overline{LIMOS}$=H

In practice, region determination unit 152 includes a thinning process unit 161, a thickening process unit 162, and an adder 163. Details thereof will be described afterwards.

MTF correction unit 153 provides pixel data (EDG7-0) that is corrected in image sharpness (MTF) to terminal A of a selector 156. Although the sharpness correction is effective for text.line copy regions, such a correction will degrade the picture quality for picture.halftone regions. Thus, selector 156 selectively provides output pixel data (DY7-0) from output pixel data (EDG7-0) of MTF correction unit 153 and the target pixel data (DC7-0) according to signal LIMOS. The condition for selection is set forth in the following.

When $\overline{LIMOS}$=L, DY7-0=EDG7-0

(A MTF correction process is carried out on the pixel data.)

When $\overline{LIMOS}$=H, DY7-0=DC7-0

Figure 28:
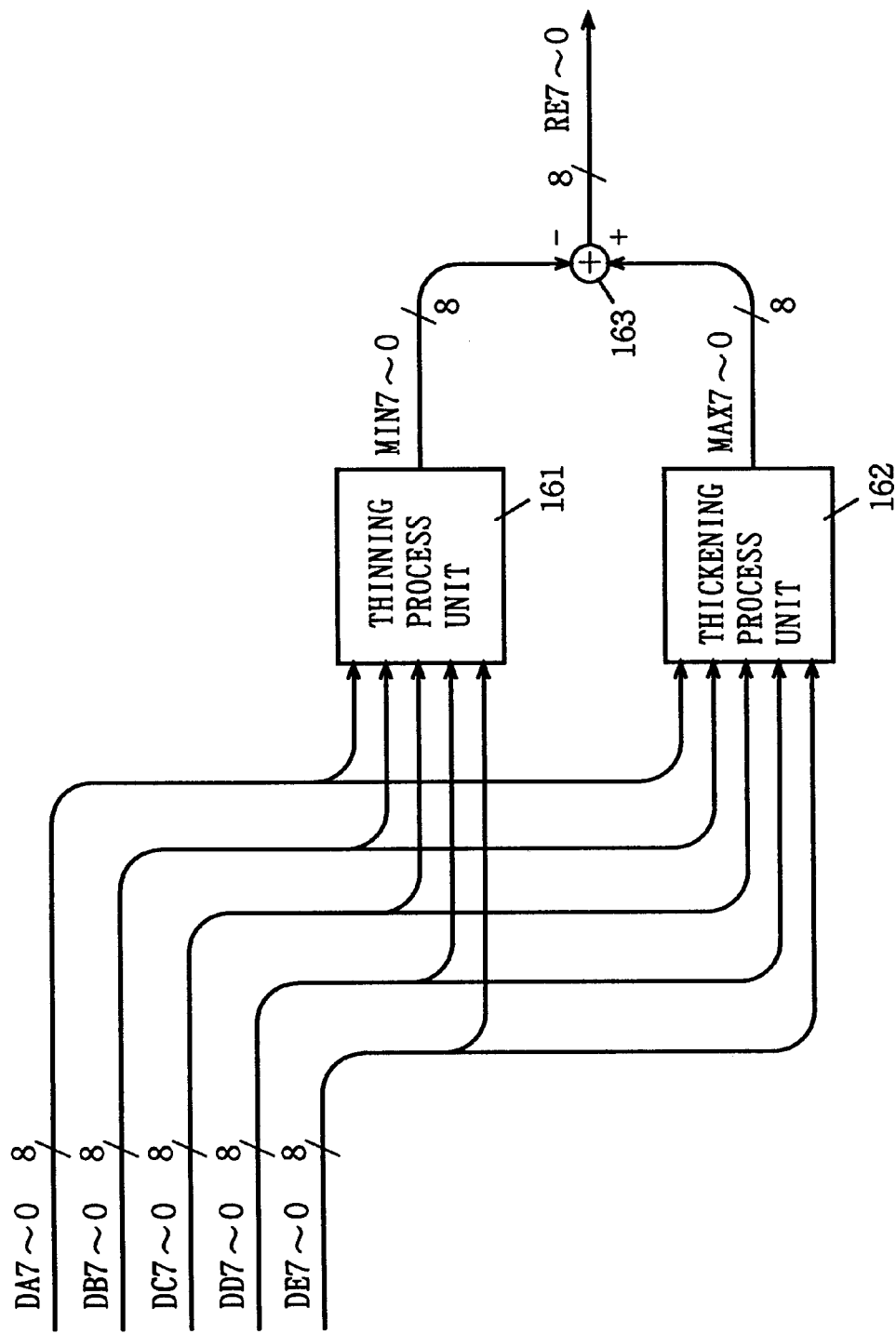
FIG. 28 is a block diagram of a region determination unit of the fifth embodiment.

(The target pixel data is directly output.) Region determination unit 152 will be described hereinafter with reference to FIG. 28. Neighborhood pixel data (DA7-0, DB7-0, DC7-0, DD7-0, and DE7-0) including the target pixel data sent from variable scale-shift process unit. 134 is applied to thinning process unit 161 and thickening process unit 162. Output pixel data (MAX7-0) from thickening process unit 162 is subtracted by the output pixel data (MIN7-0) from thinning process unit 161 in adder 163 to be output as pixel data (RE7-0) of region determination unit 152.

The structure of thickening process unit 162 will be described with reference to FIG. 29. Neighborhood pixel data (DA7-0, DB7-0, DC7-0, DD7-0, and DE7-0) including the target pixel data is applied to mask process unit 171 to be subjected to a mask process in the neighborhood region of 5×5 pixels centered about the target pixel. 25 pixel data (MAXD247-240 . . . MAXD007-000) corresponding to the neighborhood region are simultaneously applied to a maximum value detection unit 172. In maximum value detection unit 172, the largest value in the twenty-five pixel data is selected. The selected pixel data is output as output pixel data (MAX7-0) of thickening process unit 162.

Figure 30:
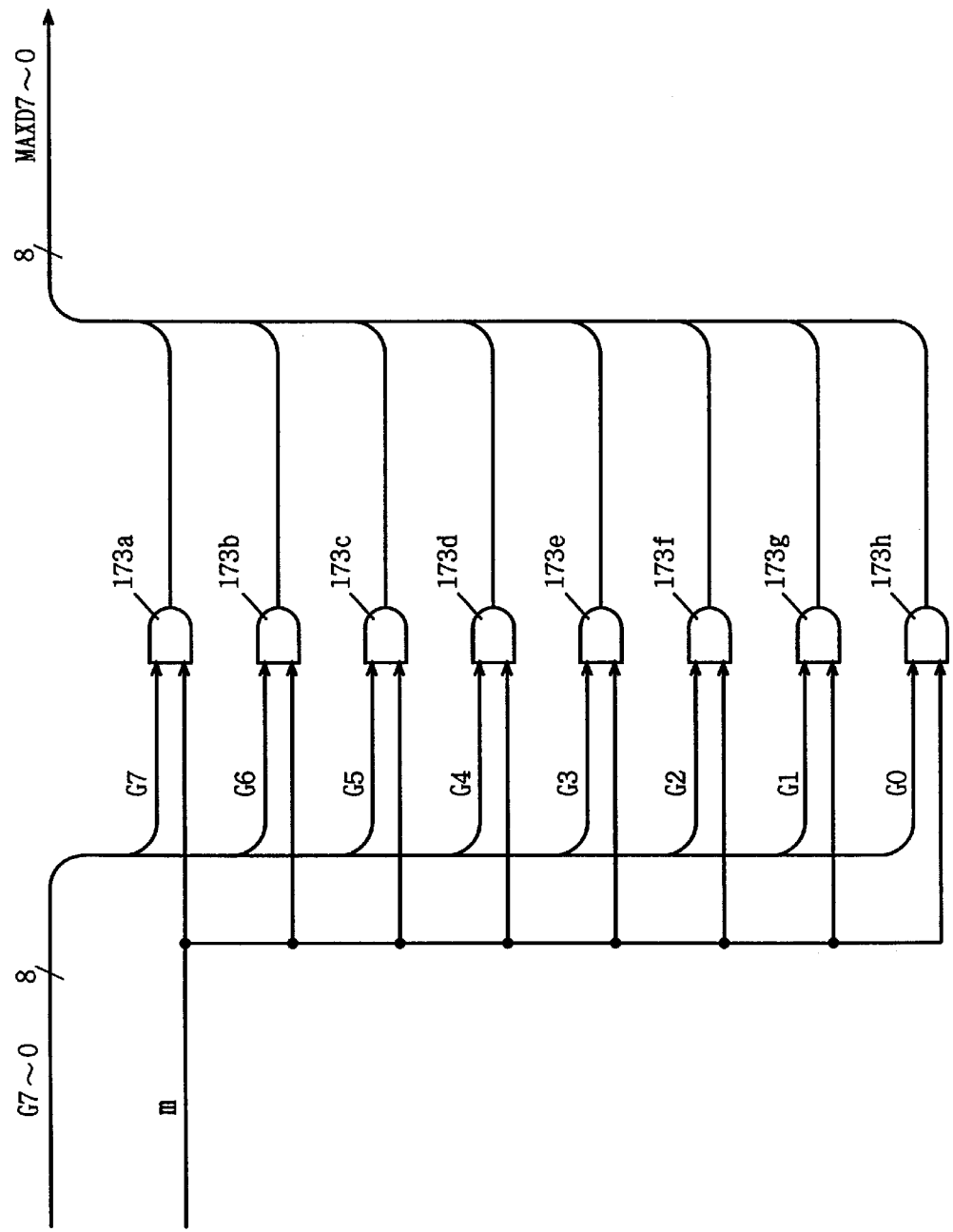
FIG. 30 is a block diagram per pixel of a pixel processing unit.

FIG. 30 is a block diagram per one pixel of mask process unit 171. FIGS. 31A–31C are diagrams for describing an example of a mask process by mask process unit 171. Mask process unit 171 carries out an operation between mask data of 1 bit as shown in FIG. 31B that is predetermined and pixel data (refer to FIG. 31A) corresponding to each pixel in the neighborhood region of the 5×5 pixels. FIG. 31C shows pixel data subjected to the process. The computation is achieved by taking the logical product of respective bits of corresponding pixel data (G7-0) for each 1 pixel and mask data (m) of 1 bit shown in FIG. 31B by AND gates 173a–173h for each pixel transmitted by any of DA7-0 . . . DE7-0 as shown in FIG. 30. According to the mask process, the neighborhood pixel data does not change when mask data (m) is set to 1, and changed to "0" when the mask data is set to "0".

Figure 29:
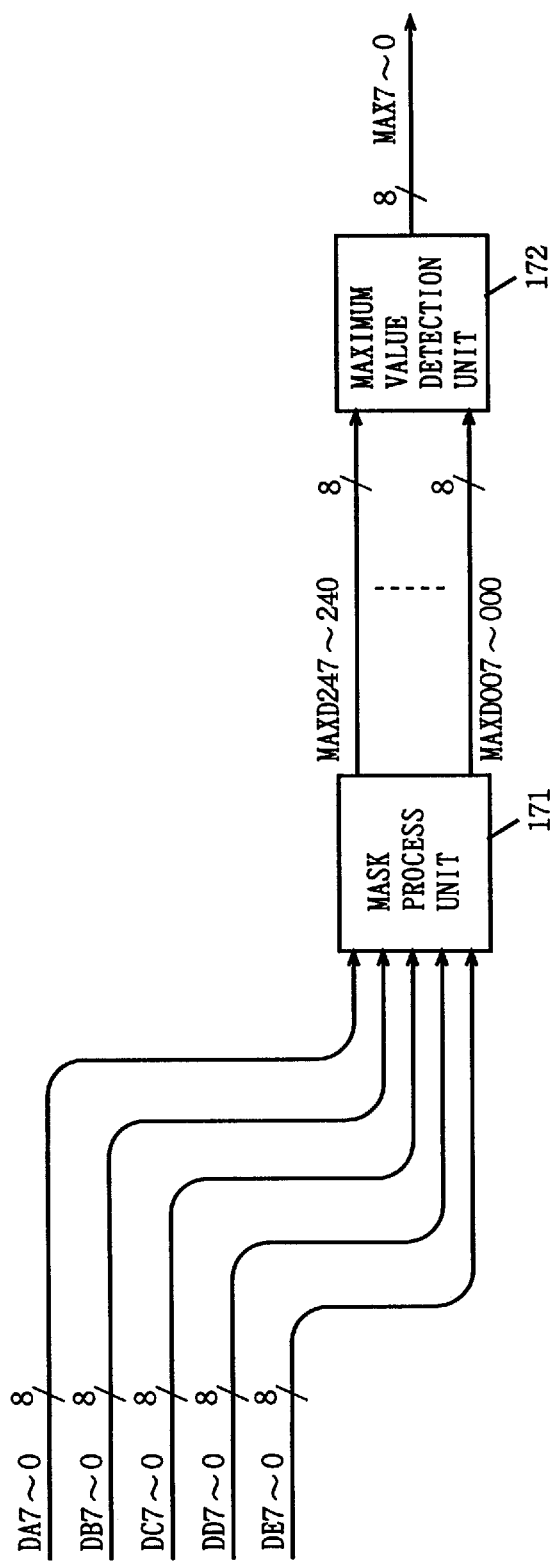
FIG. 29 is a block diagram of a thickening process unit of the fifth embodiment.

FIGS. 32A and 32B are diagrams for describing an example of detecting the maximum value by maximum value detecting unit 172 (refer to FIG. 29). FIG. 32A shows the neighborhood pixel data after the mask process. FIG. 32B shows the result of detection of the maximum value. Maximum value detection unit 172 detects the maximum value from the 25 pixel data that are subjected to the mask process. It is appreciated from FIGS. 32A and 32B that the maximum value detection region can be set in the maximum value detection unit 172 according to the above-described mask process since pixel data set to "0" by the mask process does not effect the maximum value detection.

The structure of thinning process unit 161 will be described hereinafter with reference to the block diagram of FIG. 33. Neighborhood pixel data (DA7-0, DB7-0, DC7-0, DD7-0, and DE7-0) including the target pixel data sent to thinning process unit 161 is applied to a mask process unit 181 to be subjected to a mask process in the neighborhood region of 5×5 pixels centered about the target pixel. Twenty-five pixel data (MIND247-240 MIND007-000) corresponding to the region are applied simultaneously to a minimum value detection unit 182. In minimum value detection unit 182, the smallest value of the twenty-five pixel data (MIND247-240 . . . MIND007-000) is selected to be output as pixel data (MIN7-0) of thinning process unit 161.

Figure 34:
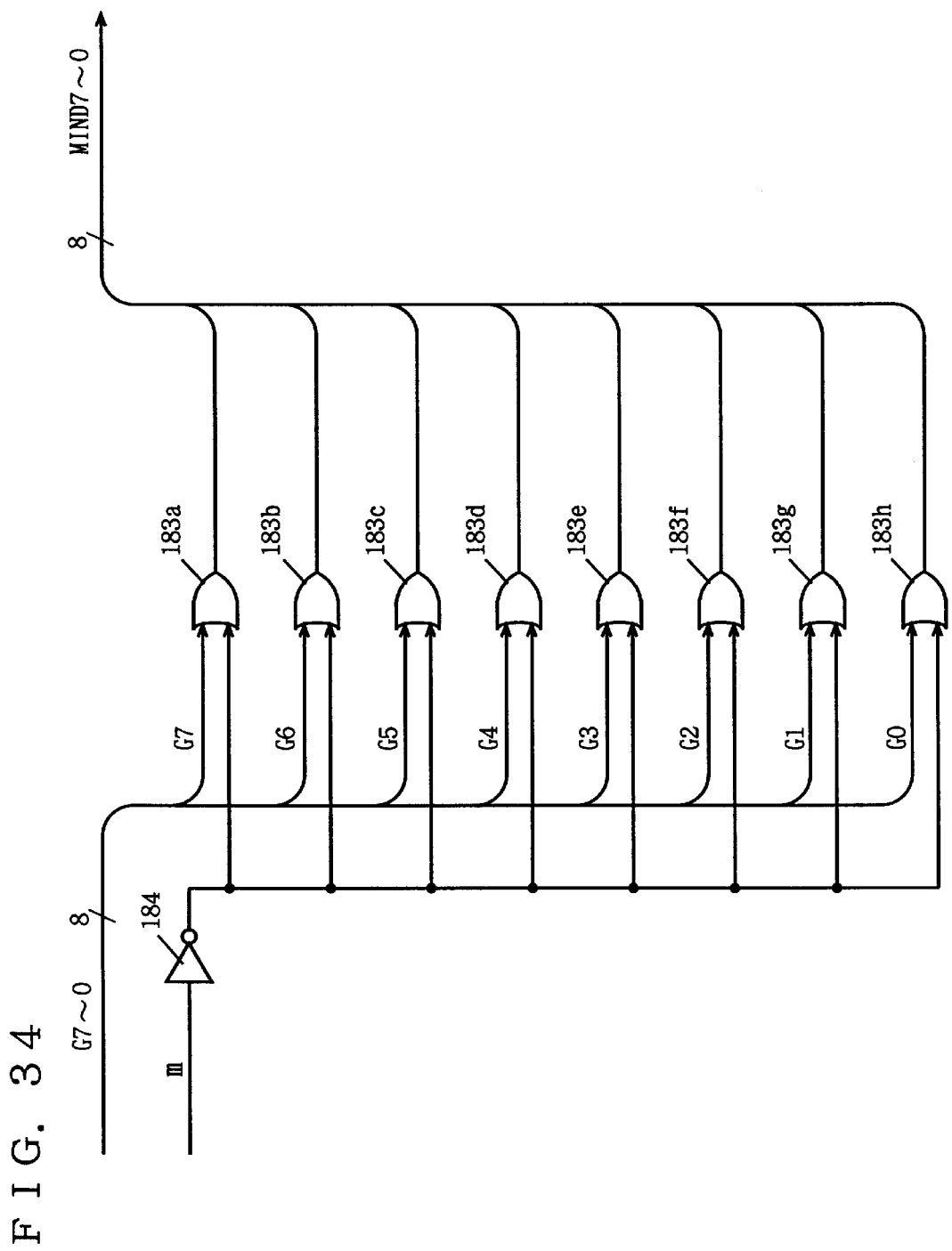
FIG. 34 is a block diagram per pixel of a mask process unit.

FIG. 34 is a block diagram per pixel of a mask process unit 181. FIGS. 35A–35C are diagrams for describing an example of a mask process carried out by mask process unit 181. The mask process of mask process unit 181 is similar to that carried out by mask process unit 171 described with reference to FIGS. 29–31C. More specifically, mask data of 1 bit as shown in FIG. 35C is predetermined. An operation is carried out with this mask data (refer to FIG. 35B) and pixel data (refer to FIG. 35A) of each pixel in the neighborhood region of 5×5 pixels. This computation is achieved by taking the logical sum of each bit of corresponding pixel data (G7-0) for every one pixel and a signal that is the mask data (m) of 1 bit of FIG. 35B having the logic inverted by an inverter 184. In this mask process, the neighborhood pixel data shows no change when the mask data is set to "1", and is changed to "255" when mask data is set to "0".

FIG. 35B shows the neighborhood pixel data after the mask process.

FIGS. 36A and 36B are diagrams for describing an example of detecting the minimum value in minimum value detection unit 182. FIG. 36A shows the neighborhood pixel data prior to being subjected to a mask process. This is substantially equal to FIG. 35C. FIG. 36B shows the result of the minimum value detection process.

In minimum value detection unit 182, the smallest value as shown in FIG. 36B is detected from the 25 pixel data that is subjected to a mask process by mask process unit 181. It is appreciated from FIGS. 36A and 36B that the minimum value detection region can be set likewise the maximum value detection by setting the mask data shown in FIG. 35B since the pixel data attaining the level of "255" by the mask process described with reference to FIGS. 35A–35C does not affect the minimum value detection process here.

The maximum value detection region and the minimum value detection region can be set independently. Although these regions are generally set to the same region, it is possible to set separate regions.

MTF correction unit 153 will be described with reference to the block diagram of FIG. 37. Neighborhood pixel data (DA7-0, DB7-0, DC7-0, DD7-0, and DE7-0) including the target pixel data sent from variable scale.shift process unit 134 is applied to thickening process unit 162 and Laplacian filter process unit 164. The signed output pixel data (LAP8-0) from Laplacian filter process unit 164 passes through lookup table unit 165 to become signed differential process data (EH7-0). Then, the pixel data (MAX7-0) output from thickening process unit 162 is added with the differential process data (EH7-0) in adder 166 to generate output pixel data (EDG7-0) from MTF correction unit 153.

Laplacian filter process unit 164 will be described with reference to FIGS. 38A–38F.

Figure 38:
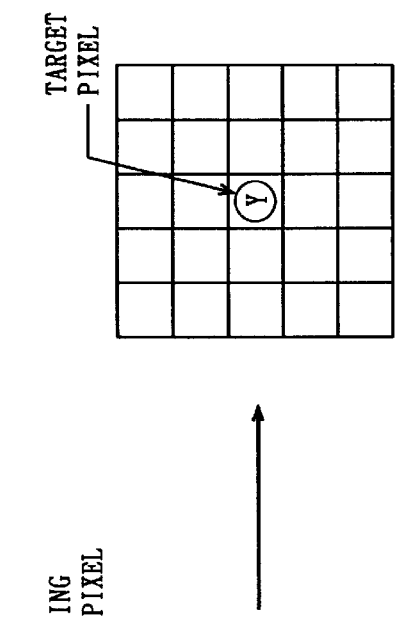
FIGS. 38A–38F are diagrams for describing an example of a Laplacian filter process by a Laplacian filter process unit.

The Laplacian filter shown in FIG. 38D is one type of the spatial filter shown in FIG. 38C. The spatial filter is assigned with a particular name according to the configuration of the employed filter data. FIG. 38D shows the configuration of the Laplacian filter used in the present embodiment.

A spatial filter process is the process of replacing the pixel data corresponding to the pixels of the neighborhood region centered about the target pixel (when the neighborhood region corresponds to 5×5 pixels, generally indicated by FIG. 38A; FIG. 38B shows a specific example thereof) with the convolution value with the corresponding filter data in the spatial filter. A Laplacian filter process corresponds to a spatial filter process employing a Laplacian filter as the spatial filter. The spatial filter process is represented by the following equation (1), where $g_{ij}$ is the pixel data of the neighboring region and $f_{ij}$ is the corresponding filter data.

$$Y = \sum_{i,j=1}^{5} f_{ij} \cdot g_{ij} \quad (1)$$

The processed result by the spatial filter of FIG. 38A and the spatial filter of the pixel data of FIG. 38C is shown in FIG. 38E. The processed result by the spatial filter of FIG. 38B and the spatial filter of the pixel data of FIG. 38D is shown in FIG. 38F. The result in FIG. 38F is obtained by the following equation.

$$108 + \left\{110 \times \left(-\frac{1}{4}\right)\right\} + \left\{18 \times \left(-\frac{1}{4}\right)\right\} + \left\{99 \times \left(-\frac{1}{4}\right)\right\} + \left\{14 \times \left(-\frac{1}{4}\right)\right\} =$$
$$108 - 27 - 4 - 24 - 3 = 50$$

It is to be noted that the pixel data output from Laplacian filter process unit 164 is data with a sign.

Figure 39:
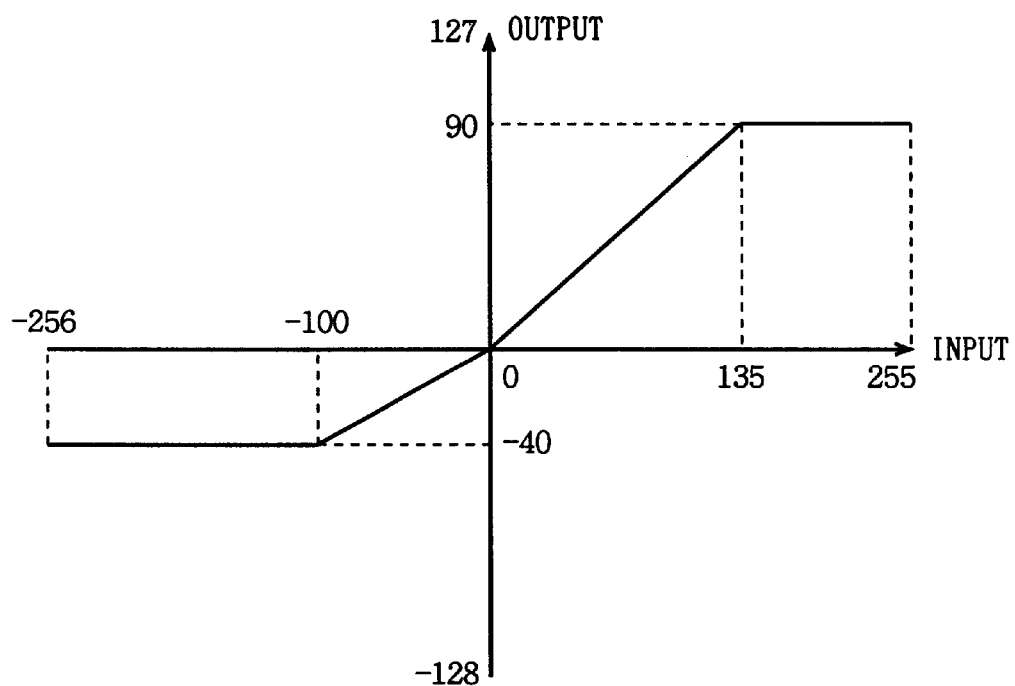
FIG. 39 shows an example of a setup of the so-called lookup table used in the lookup table unit employed in the present invention and in conventional art.

FIG. 39 shows an example of the setting of the lookup table used in lookup table unit 165. In lookup table unit 165, the signed data (LAP8-0) sent form Laplacian filter process unit 164 is subjected to an optimum table conversion and also data range compression to be output as signed data (EH7-0) for the purpose of preventing bordering of the contour portion by excessive contour enhancement process and toner fall-out.

Comparison of the result between an image process according to the fifth embodiment and an image process according to conventional art is set forth in the following.

Figure 40A:
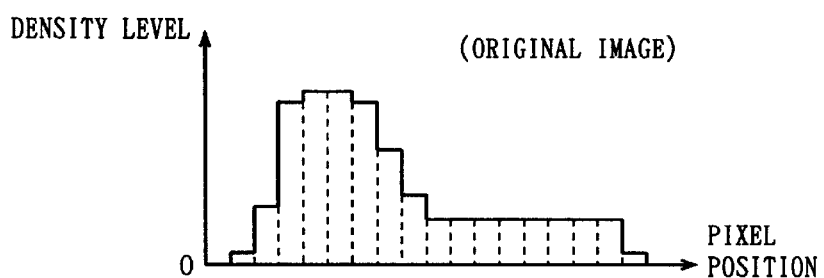
FIGS. 40A–40E are diagrams showing a result of a contour enhancement process according to the fifth embodiment and by a conventional contour enhancement process unit art.
Figure 40B:
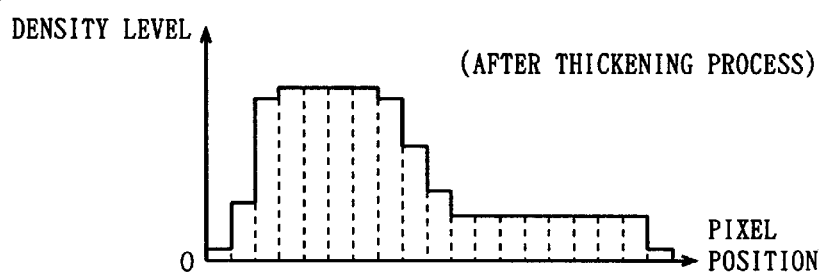
Figure 40C:
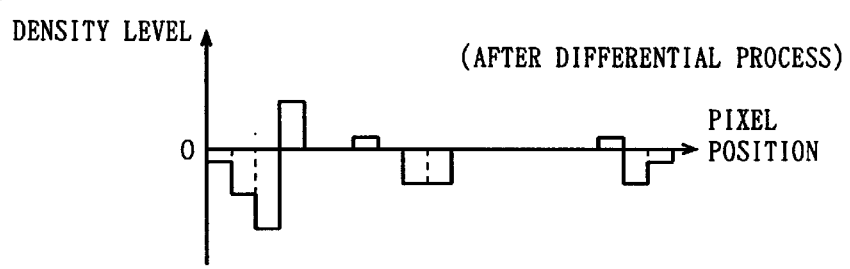
Figure 40D:
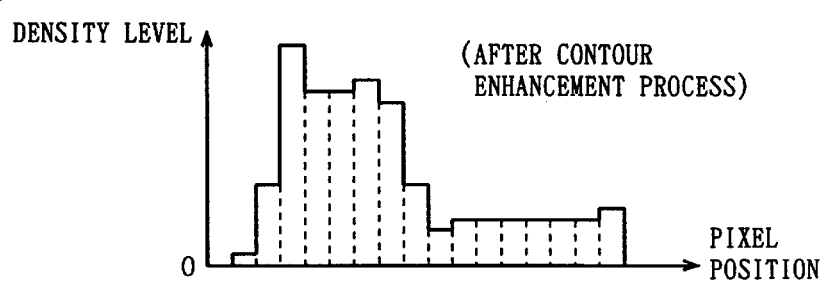
Figure 40E:
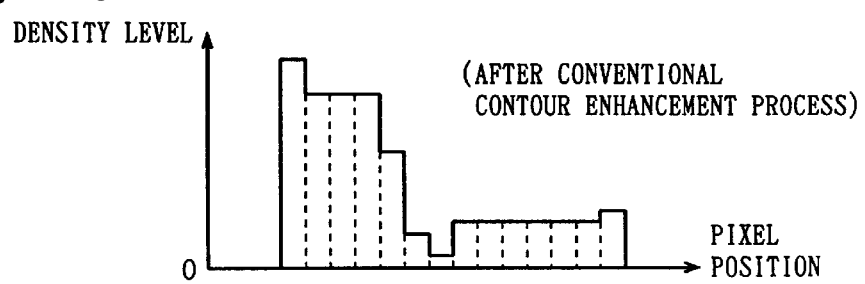

FIGS. 40A–40E show the result of the contour enhancement process according to the present embodiment and conventional art. FIG. 40A shows an example of the original image data. FIG. 40B shows an example of image data that is applied to a thickening process by thickening process unit 162. FIG. 40C shows an example of pixel data subjected to a differential process by Laplacian filter process unit 164 and lookup table unit 165. FIG. 40D shows an example of image data (EDG7-0) that has the contour enhanced by MTF correction unit 153 of FIG. 37. FIG. 40E shows an example of image data subjected to a contour enhancement process by the conventional MTF correction unit 953 (refer to FIG. 43).

The original image data shown in FIG. 40A (image data applied to MTF correction unit 153) shown in FIG. 40A is converted into image data shown in FIG. 40B by thickening process unit 162, and converted into image data shown in FIG. 40C by Laplacian filter process unit 164 and lookup table unit 165. The two data shown in FIGS. 40B and 40C are combined by adder 166. The data shown in FIG. 40D is the contour enhanced data of the present invention.

In contrast, the contour enhanced data according to the conventional processing method is generated by adding data subjected to table conversion after the Laplacian filter process to the original image data. Therefore, the resultant data is as shown in FIG. 40E which is the original image data of FIG. 40A combined with the image data of FIG. 40C.

Comparing the image data shown in FIG. 40D subjected to the contour enhancement process of the present invention with the image data shown in FIG. 40E subjected to the contour enhancement process of the conventional method, it is appreciated that the former provides a more natural contour enhancement process in which line strokes of the image are not thinned and disconnection in the lines are reduced.

An example of a process of region determination unit 152 of the present invention will be described with reference to FIGS. 41A–41E. FIG. 41A shows an example of the original image data including noise. FIG. 41B shows an example of image data subjected to a thickening process by thickening process unit 162. FIG. 41C shows an example of image data subjected to a thinning process by thinning process unit 161. FIG. 41D shows an example of the differential data (obtained by adder 163) between the data subjected to a thickening process and data subjected to a thinning process. FIG. 41E shows an example of state signal $\overline{G}$.

The original image data including noise (image data applied to region determination unit 152) shown in FIG. 41A is converted into image data of FIG. 41B by thickening process unit 162 and into image data of FIG. 41C by thinning process unit 161. The two image data of FIGS. 41B and 41C are applied to adder 163, where the latter is subtracted from the former to result in the differential data shown in FIG. 41D. The data of FIG. 41D is compared with a threshold value set at output port 157a by comparator 154 to be converted into state signal $\overline{G}$ of FIG. 41E.

Figure 42A:
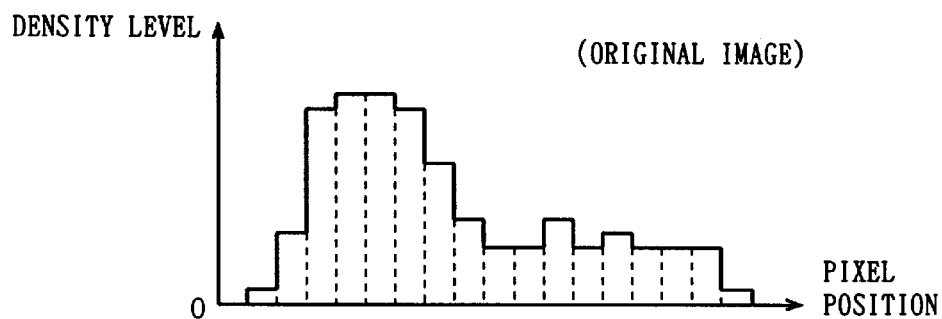
FIGS. 42A–42D show an integration process of a region determination/MTF correction unit according to the image processing apparatus of the fifth embodiment.
Figure 42B:
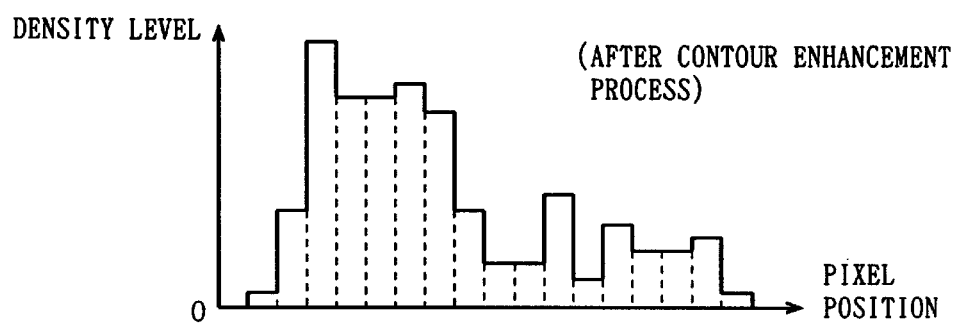
Figure 42C:
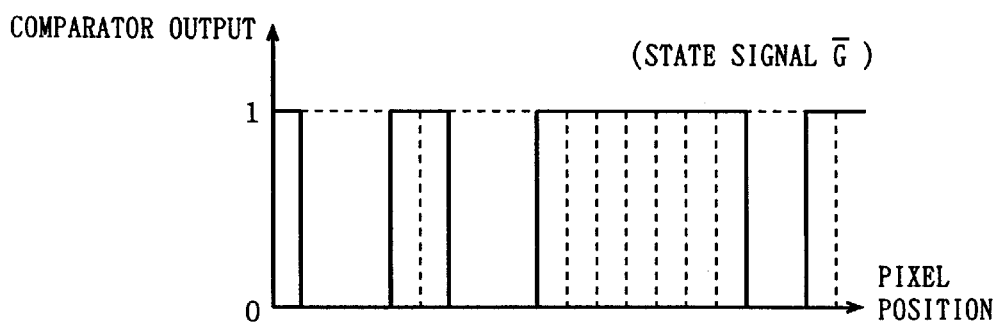
Figure 42D:
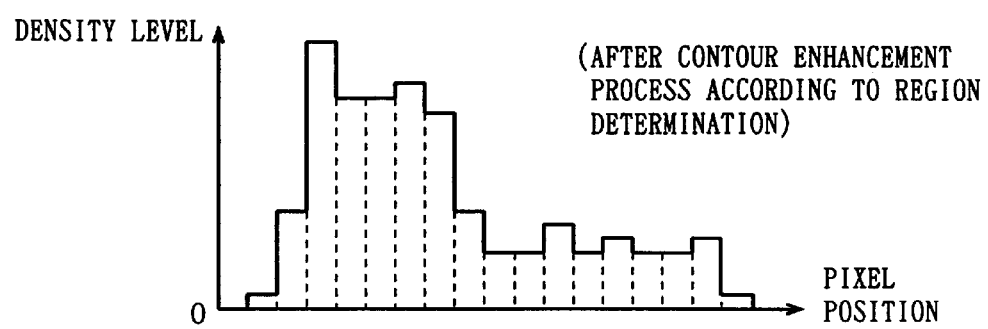

A process of region determination/MTF correction unit 135 of the present embodiment will be described with reference to FIGS. 42A–42D. FIG. 42A shows an example of the original image data including noise. FIG. 42B shows an example of image data subjected to a contour enhancement process according to the present embodiment. FIG. 42C shows an example of state signal $\overline{G}$. FIG. 42D shows an example of the image data subjected to a contour enhancement process according to the present invention when the process is switched in response to the result of the region determination.

State signal $\overline{G}$ (signal $\overline{SW}$ signal attains an L level) is generated from the original image data including noise shown in FIG. 42A by region determination unit 152 and comparator 154. According to state signal $\overline{G}$, image data that is processed according to the switching of the MTF correction process (contour enhancement process) is the image data shown in FIG. 42D. Image data subjected to a MTF correction process over the entire image with no discrimination in the region is shown in FIG. 42B.

By switching the setting of whether to apply or not a MTF correction process according to the result of the region determination, an optimum contour enhancement process can be carried out for the required area without enhancing the noise in the image.

In the image processing apparatus including image process unit 115 of the fifth embodiment, MTF correction unit 153 described with reference to FIGS. 27 and 37 forms the contour enhancement unit that applies a contour enhancement process on input image data that is constituted by successively input image data from CCD 114 which is an example of an image reader that reads out the original image.

Laplacian filter process unit 164 and lookup table unit 165 that converts input pixel data (DA7-0) and pixel data (DB7-0, DC7-0, DD7-0, and DE7-0) into differential processed data (EH7-0) form the data adjustment unit for adjusting the input pixel data to enhance the contour of the input image data.

In this data adjustment unit, Laplacian filter process unit 164 that carries out a differential operation process using the pixel data in the neighborhood of the target pixel data and a Laplacian filter forms the differential operation unit that carries out a differential operation process according to the data of the input pixel in the neighborhood of the predetermined target pixel data in the input pixel data. Also, lookup table unit 165 for carrying out table conversion using the lookup table shown in FIG. 39 forms the data conversion unit for converting the pixel data subjected to a differential operation process by the differential operation unit according to a predetermined conversion table.

Thickening process unit 162 for converting input pixel data (DA7-0) and pixel data (DB7-0, DC7-0, DD7-0, DE7-0) into output data (MAX7-0) from thickening process unit 162 forms the thickening process unit provided parallel to the data adjustment unit for carrying out a process of thickening the input pixel data.

In this thickening process unit, mask process unit 171 for extracting a plurality of input pixel data located at a particular position (specified by the mask of FIG. 31B) with respect to the target pixel data indicated in FIG. 31A by a mask process forms the thickening process data extraction unit for extracting a plurality of input pixel data located at a predetermined position with respect to the target pixel data. Also, maximum value detection unit 172 for providing the maximum value data from the data subjected to a mask process (FIG. 32A) by mask process unit 171 forms the maximum value output unit for providing the maximum data from the input pixel data extracted by the thickening process data extraction unit, as shown in FIG. 32A and 32B, Adder 166 that generates output data (EDG7-0) from MTF correction unit 153 using output data (MAX7-0) from thickening process unit 162 and differential process data (EH7-0) forms the contour enhancement data output unit that provides image data constituting the image data corresponding to input image data subjected to a contour enhancement process using the pixel data adjusted by the data adjustment unit and the pixel data thickened by the thickening process unit.

In the contour enhancement data output unit, adder 166 that adds the output data (MAX7-0) from thickening process unit 162 with differential processed data (EH7-0) for generating output data (EDG7-0) from MTF correction unit 153 forms the data adder unit for adding the pixel data converted by the data conversion unit to the maximum value data.

According to the above-described embodiment, region determination unit 152, comparator 154 and OR circuit 155 for providing a region determination signal $\overline{LIMOS}$ according to input pixel data (DA7-0, DB7-0, DC7-0, DD7-0, and DE7-0) form the region determination unit that provides a determination signal that classifies whether the input pixel data resides in a region that is to be subjected to a process by the data adjustment unit, the thickening process unit, and the contour enhancement data output unit.

In the region determination unit, thinning process unit 161 provided parallel to the thickening process unit constituted by thickening process unit 162 for converting the input pixel data (DA7-0, DB7-0, DC7-0, DD7-0, and DE7-0) into data (MIN7-0) output from thinning process unit 161 forms the thinning process unit provided parallel to the thickening process for carrying out a process to thin the input pixel data.

Adder 163 that generates output data (RE7-0) of region determination unit 152 from the output data (MAX7-0) of thickening process unit 162 and the output data (MIN7-0) of thinning process unit 161 forms the subtractor unit that provides differential data which is the difference between the pixel data thickened by the thickening process unit and the pixel data thinned by the thinning process unit.

Comparator 154 that generates signal $\overline{G}$ from the output data (RE7-0) of region determination unit 152 and the output data (REF7-0) of output port 157a and OR circuit 155 that generates signal $\overline{LIMOS}$ according to signal $\overline{G}$ and output data ($\overline{SW}$) of output port 157b forms the determination signal output unit for providing a determination signal that determines whether the input pixel data resides in a region to which the process by the data adjustment unit, the thickening process unit, and the contour enhancement data output unit is to be carried out according to the output result of the subtractor unit.

In the determination signal output unit, comparator 154 for providing signal $\overline{G}$ and OR circuit 155 providing signal $\overline{LIMOS}$ attaining either an L or H level form the binarization unit that binarizes the differential data to output the determination signal.

In the above-described embodiment of the present invention, the maximum value data output from the maximum data output unit can be used in the contour enhancement unit formed by MTF correction unit 153 and also by the region determination unit formed by region determination unit 152, comparator 154 and OR circuit 155.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:

contour enhancement means for enhancing a contour of an image with respect to image data formed of successively input pixel data to output contour enhanced image data, maximum value output means to substitute target pixel data in said contour enhanced image data with the maximum density data which is selected in the target pixel data and data of surrounding pixels for output;

minimum value output means to substitute target pixel data in said contour enhanced image data with the minimum density data which is selected in the target pixel data and data of surrounding pixels for output; and neighborhood select means receiving first data based on said maximum density data and second data based on said minimum density data for selecting any one of said first data and said second data according to a predetermined condition.

2. An image processing apparatus comprising:

contour enhancement means for enhancing a contour of an image with respect to image data formed of successively input pixel data to output contour enhanced image data, first maximum value output means to substitute target pixel data in said contour enhanced image data with the maximum density data which is selected in the target pixel data and data of surrounding pixels for output, first minimum value output means to substitute target pixel data in said first maximum density data with the minimum density data which is selected in the target pixel data and data of surrounding pixels for output, second minimum value output means to substitute target pixel data in said contour enhanced image data with the minimum density data which is selected in the target pixel data and data of surrounding pixels for output, second maximum value output means to substitute target pixel data in said second minimum density data with the maximum density data which is selected in the target pixel data and data of surrounding pixels for output, and neighborhood select means receiving said first minimum density data and said second maximum density data for selecting any one of said first minimum density data and said second maximum density data according to a predetermined condition.

3. An image processing apparatus having a function of applying a contour enhancement process on image data constituted by successively input pixel data to enhance a contour of an image, comprising:

thickening process means for thickening pixel data by substituting target pixel data in said input pixel data with the maximum density data in the target pixel data and data of surrounding pixels and providing the maximum density data, data adjustment means for adjusting said input pixel data in parallel to said thickening process, and contour enhanced data output means for providing contour enhanced data using pixel data adjusted by said data adjustment means and pixel data thickened by said thickening process means.

4. An image processing method comprising the steps of:

enhancing a contour of an image with respect to image data constituted by image data input successively, and providing contour enhanced image data, substituting target pixel data in said contour enhanced image data with the maximum density data which is selected in the target pixel data and data of surrounding pixels for providing the first maximum density data, substituting target pixel data in said first maximum density data with the minimum density data which is selected in the target pixel data and data of surrounding pixels and providing the first minimum density data, substituting target pixel data in said contour enhanced image data with the minimum density data which is selected in the target pixel data and data of surrounding pixels and providing the second minimum density data, substituting target pixel data in said second minimum density data with the maximum density data which is selected in the target pixel data and data of surrounding pixels and providing the second maximum density data, and providing any one of said first minimum density data and said second maximum density data according to a predetermined condition.

5. An image processing method for carrying out a contour enhancement process on pixel data formed by pixel data input successively to enhance a contour of an image, comprising the steps of:

thickening pixel data by substituting target pixel data in said input pixel data with the maximum density data in the target pixel data and data of surrounding pixels and providing the maximum density data, adjusting said input pixel data in parallel to said thickening process, and providing contour enhanced data using said adjusted pixel data and said thickened pixel data.

6. An image reading method comprising the steps of:

enhancing a contour of an image with respect to image data formed of successively input pixel data to output contour enhanced image data, substituting target pixel data in said contour enhanced image data with the maximum density data which is selected in the target pixel data and data of surrounding pixels for output;

substituting target pixel data in said contour enhanced image data with the minimum density data which is selected in the target pixel data and data of surrounding pixels for output; and receiving first data based on said maximum density data and second data based on said minimum density data for selecting any one of said first data and said second data according to a predetermined condition.

7. The image processing apparatus according to claim 2, wherein said predetermined condition is whether a density value in the target pixel data in said contour enhanced image data is at least a predetermined standard value, wherein said selector means provides said first minimum density data and said second maximum density data when the density value in the target pixel data in said contour enhanced image data is at least said standard value and less than said standard value, respectively.

8. The image processing apparatus according to claim 7, further comprising binarization means for converting said contour enhanced image data into binary data and providing the binary data to said first maximum value output means and said second minimum value output means.

9. The image processing apparatus according to claim 8, wherein said predetermined condition is whether there are more than a predetermined number of data indicating high density in the target pixel data and surrounding data in said contour enhanced image data binarized by said binarization means, wherein said select means provides said first minimum density data and said second maximum density data when said data indicating high density is at least said predetermined number and less than said predetermined number, respectively.

10. The image processing apparatus according to claim 2, further comprising binarization means for converting said contour enhanced image data into binary data and providing the binary data to said first maximum value output means and said second minimum value output means.

11. The image processing apparatus according to claim 10, wherein said predetermined condition is whether there are more than a predetermined number of data indicating high density in target pixel data and surrounding data in said contour enhanced image data binarized by said binarization means, wherein said select means provides said first minimum density data and said second maximum density data when said data indicating high density is at least said predetermined number and less than said predetermined number, respectively.

12. The image processing apparatus according to claim 3, wherein said data adjustment means comprises differential operation means for applying a differential operation process on target pixel data in said input pixel data according to input pixel data located at a surrounding region.

13. The image processing apparatus according to claim 12, wherein said data adjustment means further comprises data conversion means for converting image data subjected to said differential operation process according to a predetermined conversion table.

14. The image processing apparatus according to claim 13, wherein said contour enhanced data output means comprises adder means for adding pixel data converted by said data conversion means to said maximum density data.

15. The image processing apparatus according to claim 3, further comprising region determination means for determining whether said input pixel data corresponds to a pixel residing in a region that is to be subjected to a process by said data adjustment means, said thickening process means, and said contour enhanced data output means.

16. The image processing apparatus according to claim 15, wherein said region determination means comprises thinning process means for thinning pixel data by substituting target pixel data in said input pixel data with the minimum density data in the target pixel data and data of surrounding pixels and providing the minimum density data, wherein said region determination means carries out determination of a region according to differential data which is difference between maximum density data output from said thickening process means and minimum density data output from said thinning process means.

17. The image processing apparatus according to claim 15, wherein said region determination means determines whether said input pixel data resides in a half tone region or a text region.

18. The image processing apparatus according to claim 16, wherein said region determination means determines that said input pixel data resides in a region that is to be applied to a process by said data adjustment means, said thickening process means, and said contour enhancement data output means when said input pixel data resides in a text region.

* * * * *